United States Patent
Li et al.

(10) Patent No.: US 11,093,520 B2
(45) Date of Patent: Aug. 17, 2021

(54) INFORMATION EXTRACTION METHOD AND SYSTEM

(71) Applicant: TENCENT TECHNOLOGY (SHENZHEN) COMPANY LIMITED, Shenzhen (CN)

(72) Inventors: Yang Li, Shenzhen (CN); Feng Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 158 days.

(21) Appl. No.: 16/385,163

(22) Filed: Apr. 16, 2019

(65) Prior Publication Data

US 2019/0243842 A1 Aug. 8, 2019

Related U.S. Application Data

(63) Continuation of application No. PCT/CN2017/115185, filed on Dec. 8, 2017.

(30) Foreign Application Priority Data

Dec. 22, 2016 (CN) .......................... 201611200449.8

(51) Int. Cl.
*G06F 16/00* (2019.01)
*G06F 16/25* (2019.01)
(Continued)

(52) U.S. Cl.
CPC ........ *G06F 16/258* (2019.01); *G06F 16/2246* (2019.01); *G06F 16/322* (2019.01);
(Continued)

(58) Field of Classification Search
CPC ............... G06F 16/2246; G06F 16/258; G06F 16/8373; G06F 16/313; G06F 40/295;
(Continued)

(56) References Cited

U.S. PATENT DOCUMENTS 7,650,320 B2 * 1/2010 Nakano ............... G06F 16/2264
706/48
8,032,476 B2 * 10/2011 Nakano ................... G06F 16/41
706/48
(Continued)

FOREIGN PATENT DOCUMENTS

CN 101727461 A 6/2010
CN 102456050 A 5/2012
(Continued)

OTHER PUBLICATIONS

The World Intellectual Property Organization (WIPO) International Search Report for PCT/CN2017/115185 dated Mar. 8, 2018 6 Pages (including translation).

(Continued)

*Primary Examiner* — Jean M Corrielus
(74) *Attorney, Agent, or Firm* — Anova Law Group, PLLC

(57) ABSTRACT

The present disclosure provides an information extraction method. The method includes obtaining an unstructured text data; parsing the unstructured text data based on a node format; and generating a first node set that comprises nodes describing the unstructured text data. The method further includes obtaining a rule database, the rule database comprising a plurality of rules used for generating a node, each rule designating a role of a node generated by using the rule, and the role of the node being a root node or a non-root node; synthesizing the nodes in the first node set based on the rule database to generate a root node; and generating structured data based on the root node.

12 Claims, 15 Drawing Sheets

(51) Int. Cl.
*G06F 40/00* (2020.01)
*G06F 40/55* (2020.01)
*G06F 40/205* (2020.01)
*G06F 16/31* (2019.01)
*G06F 16/22* (2019.01)
*G06F 16/903* (2019.01)

(52) U.S. Cl.
CPC ........ *G06F 16/90344* (2019.01); *G06F 40/00* (2020.01); *G06F 40/205* (2020.01); *G06F 40/55* (2020.01)

(58) Field of Classification Search
CPC ...... G06F 16/3344; G06F 40/00; G06F 40/55; G06F 40/205; G06F 16/322; G06F 16/90344; G06F 17/2705; G06F 17/2872; G06F 16/25; G06F 16/22; G06F 16/31; G06F 16/903; G06F 17/27; G06F 17/28; G06F 16/00; G06F 17/00; G06F 17/30; G06F 17/2805; G06F 16/211; G06F 16/2477; G06F 16/283
See application file for complete search history.

(56) References Cited

U.S. PATENT DOCUMENTS

| | | | | |
|---|---|---|---|---|
| 2005/0278368 | A1* | 12/2005 | Benedikt | G06F 16/84 |
| 2006/0190465 | A1* | 8/2006 | Nakano | G06F 16/322 |
| 2007/0124291 | A1* | 5/2007 | Hassan | G06F 16/34 |
| 2010/0076981 | A1* | 3/2010 | Nakano | G06F 16/3347 |
| | | | | 707/741 |
| 2011/0213783 | A1* | 9/2011 | Keith, Jr. | G06F 16/954 |
| | | | | 707/741 |
| 2012/0036100 | A1 | 2/2012 | Probst et al. | |
| 2014/0079297 | A1* | 3/2014 | Tadayon | G06K 9/00288 |
| | | | | 382/118 |
| 2014/0236579 | A1* | 8/2014 | Kurz | G06F 16/3344 |
| | | | | 704/9 |
| 2016/0350854 | A1* | 12/2016 | Elliott | G06Q 40/02 |
| 2017/0075904 | A1* | 3/2017 | Hedges | G06F 16/367 |
| 2017/0153914 | A1* | 6/2017 | Rausch | G06F 16/24532 |
| 2017/0220433 | A1* | 8/2017 | Dimnaku | G06F 11/008 |
| 2020/0183817 | A1* | 6/2020 | Scholz | G06F 11/3684 |

FOREIGN PATENT DOCUMENTS

| | | |
|---|---|---|
| CN | 103077164 A | 5/2013 |
| CN | 103473285 A | 12/2013 |
| CN | 104536950 A | 4/2015 |
| CN | 104615724 A | 5/2015 |
| CN | 105677638 A | 6/2016 |

OTHER PUBLICATIONS

The State Intellectual Property Office of the People's Republic of China (SIPO) Office Action 1 for for 201611200449.8 dated Mar. 1, 2021 9 Pages (including translation).

Jinna Ma, "Research on WEB Topic Information Extraction Based on the Importance of DOM Tree Nodes," cnki master's thesis library, Apr. 21, 2016 (Apr. 21, 2016). 63 pages.

* cited by examiner

INFORMATION EXTRACTION METHOD AND SYSTEM

RELATED APPLICATIONS

This application claims priority to PCT Application No. PCT/CN2017/115185, filed on Dec. 8, 2017, which in turn claims priority of Chinese Patent Application No. 201611200449.8, filed with the Chinese Patent Office on Dec. 22, 2016 and entitled "INFORMATION EXTRACTION METHOD AND SYSTEM." The two applications are incorporated herein by reference in their entirety.

FIELD OF TECHNOLOGY

This application relates to the field of information extraction, and in particular, to an information extraction method and system that are applicable to different texts.

BACKGROUND OF THE DISCLOSURE

With rapid development of Internet technologies, the Web has developed into a huge, distributed, and shared information resource. Massive amount of information on the Web may be divided into three categories: structured information, semi-structured information, and un-structured information. Structured data may be organized into a row and column structure. A characteristic of the structured data is that a location at which a value appears are fixed, and therefore the data can be accurately located, and is generally managed by a database. Semi-structured data, such as a subdivision channel on a professional website, has standard title and text grammar. Un-structured data refer to data that have an irregular or incomplete data structure, do not have a predefined data model, and are inconvenient to be represented by using a two-dimensional logic table of a database, and include an office document, a text, a picture, XML data, HTML data, various types of reports, image and audio/video data, and so on in all formats. Most of the Web data exist in a form of un-structured data, and the un-structured data cannot be understood or utilized by an application program.

SUMMARY

To enable massive amount of un-structured Web data to be utilized, embodiments of this application provide an information extraction method and system and a storage medium.

One aspect of the present disclosure provides an information extraction method. The method includes obtaining an unstructured text data; parsing the unstructured text data based on a node format; and generating a first node set that comprises nodes describing the unstructured text data. The method further includes obtaining a rule database, the rule database comprising a plurality of rules used for generating a node, each rule designating a role of a node generated by using the rule, and the role of the node being a root node or a non-root node; synthesizing the nodes in the first node set based on the rule database to generate a root node; and generating structured data based on the root node.

Another aspect of the present disclosure provides an information extraction system. The system includes at least one processor and a memory, the memory storing a computer readable instruction, and the instruction being capable of enabling the at least one processor to implement the information extraction method. The method includes obtaining an unstructured text data; parsing the unstructured text data based on a node format; and generating a first node set that comprises nodes describing the unstructured text data. The method further includes obtaining a rule database, the rule database comprising a plurality of rules used for generating a node, each rule designating a role of a node generated by using the rule, and the role of the node being a root node or a non-root node; synthesizing the nodes in the first node set based on the rule database to generate a root node; and generating structured data based on the root node.

Another aspect of the present disclosure provides a computer readable storage medium. The computer readable storage medium according to an embodiment of this application may include a computer readable instruction, the instruction being capable of enabling the at least one processor to obtain an unstructured text data; parse the to-be-extracted text based on a preset node format, to generate a first node set that includes nodes describing the unstructured text data; obtain a preset rule database, the rule database including a plurality of rules used for generating a node, each rule designating a role of a node generated by using the rule, and the role of the node being a root node or a non-root node; and synthesize the nodes in the first node set based on the rule database to generate a root node, and generate structured information based on the root node.

According to the technical solutions in the embodiments of this application, unstructured text data can be segmented into words. These words are described by using structured data, and then the structured data is combined by using a preset rule, to obtain a root node that describes the unstructured text data, and use the structured data in the root node as extracted structured data. Extraction logic is based on the preset rule, and has relatively low system costs because a large quantity of tagging and extraction model training are not needed.

DESCRIPTION OF EMBODIMENTS

To make the objectives, technical solutions, and advantages of the present disclosure more comprehensible, the present disclosure is further described in detail below with reference to the accompanying drawings and embodiments. It should be understood that, the specific embodiments described herein are used only for explaining the present disclosure, and are not used for limiting the present disclosure.

Figure 1A:
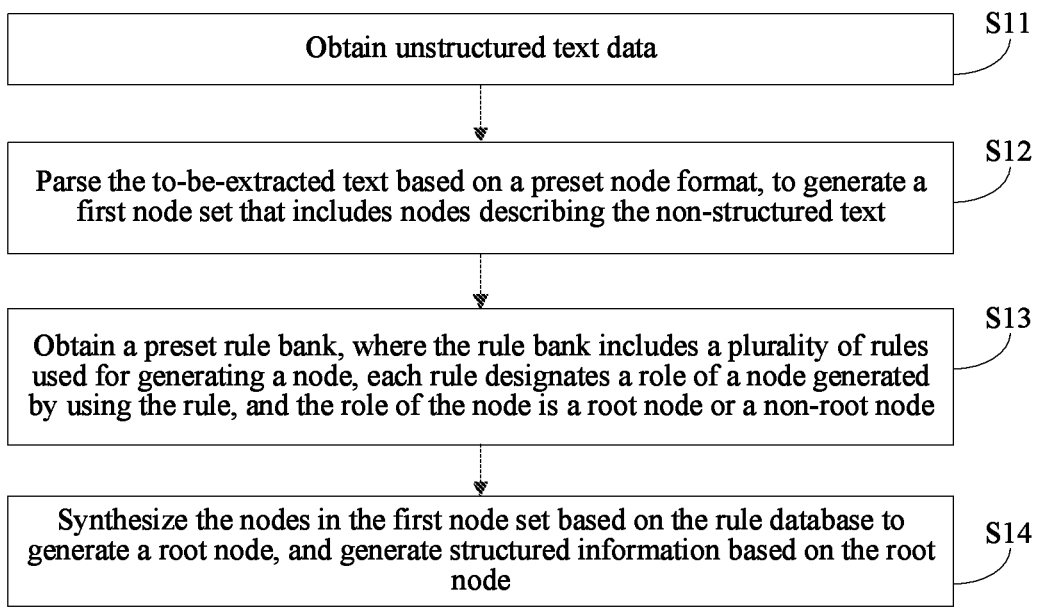
FIG. 1a is a flowchart of an information extraction method according to embodiments of this application.

Information extraction solutions in the embodiments of this application are used for extracting structured data from un-structured data. Information in massive amount of un-structured data can be understood and processed by a computer. FIG. 1a is a flowchart of an information extraction method according to embodiments of this application. The information extraction method may be performed by a computing device (such as a server and a PC). For example, the extraction method may be performed by an information extraction application in the computing device. As shown in FIG. 1a, the method may include the following steps.

Step S11: Obtain an unstructured text data.

Step S12: Parse the to-be-extracted text based on a preset node format, to generate a first node set that includes nodes describing the unstructured text data.

Step S13: Obtain a preset rule database, where the rule database includes a plurality of rules used for generating a node, each rule designates a role of a node generated by using the rule, and the role of the node is a root node or a non-root node.

Step S14: Synthesize the nodes in the first node set based on the rule database to generate a root node, and generate structured information based on the root node.

Figure 1B:
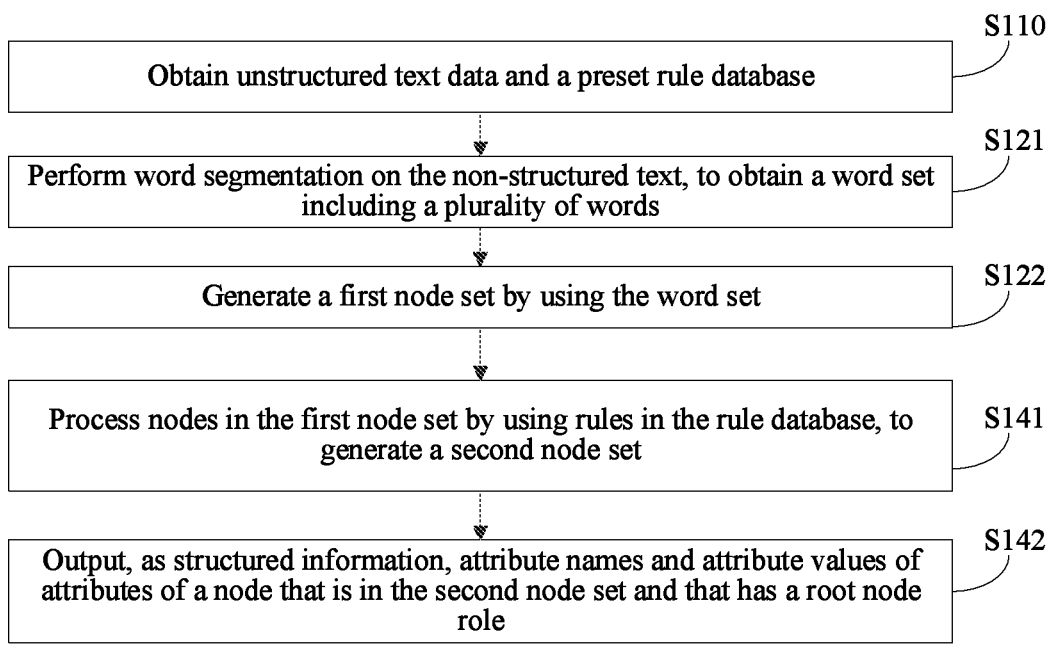
FIG. 1b is a flowchart of an information extraction method according to embodiments of this application.

FIG. 1b is a flowchart of an information extraction method according to embodiments of this application. The information extraction method may be performed by a computing device (such as a server and a PC), for example, may be performed by an information extraction application in the computing device. As shown in FIG. 1b, the method may include the following steps:

Step S110: Obtain an unstructured text data and a preset rule database.

The unstructured text data may be obtained from a memory of the computing device or a storage device on a network. The unstructured text data may be obtained from files in various formats, such as an office document, an XML file, and an HTML file.

The rule database includes a plurality of rules (hereinafter also referred to as a node synthesis rule) used for generating a node. Each rule designates a role of a node generated by using the rule, and the role of the node is a root node or a non-root node. In this document, a node is structured data in a preset format, and may be used for describing a text, for example, a character, a word, a phrase, or a sentence. The rule database may be transmitted and stored in a form of a file. The rule database may include one or more files. Files included in the rule database may be obtained in various manners. For example, a file may be read from a preset location (such as a URL or a storage path in the computing device) in the information extraction application, and added to the rule database. For another example, the information extraction application may provide a file input interface, and a file is received by using the file input interface and added to the rule database. The embodiments do not limit a source of the file in the rule database, and these files may be obtained in any possible manner.

Step S121: Perform word segmentation on the unstructured text data, to obtain a word set including a plurality of words.

The word segmentation means that a text is segmented into single words. Different word segmentation technologies may be used for texts in different languages.

In some examples, an arrangement sequence of the nodes in the word set is consistent with an arrangement sequence in the unstructured text data.

Step S122: Generate a first node set by using the word set.

Each node in the first node set is used for describing one word in the word set, including attribute names and attribute values of one or more attributes.

In some examples, a node corresponding to a word may be generated by using a preset processing method. The node complies with the preset node format (to be specific, "a node format of a node that expresses text information" hereinafter). For example, the node may include a node name and one or more attributes. The preset processing method may include extracting information from a word as a node name of a node or an attribute value of a specified attribute. For example, a type of word (or a word type) of a word may be extracted as an attribute value of an attribute "type of word (or a word type)" of a node corresponding to the word; a character string corresponding to the word may be extracted as a node name of the node corresponding to the word, an attribute value of an attribute "text", or the like. The embodiments do not limit a type of information extracted from the word and a manner of extracting the information from the word. The preset processing method may include a preset processing method in a configuration file of the information extraction application, and may also include a custom processing method for receiving an external input.

In some examples, the first node set may be formed by using nodes corresponding to all words in the word set. In some examples, the first node set may be formed by using nodes corresponding to some words in the word set. For example, the words in the word set may be filtered, to remove some meaningless words, and form the first node set by using nodes corresponding to the remaining words.

Step S141: Process nodes in the first node set by using rules in the rule database, to generate a second node set.

Each node in the second node set describes at least one node in the first node set.

By using steps S12 and S13, the unstructured text data has been converted into the first node set that describes the words in the unstructured text data. Each node includes one or more pieces of information (namely, an attribute value) extracted from one word, and each node describes only a simple language material (namely, a single word). In other words, a task of steps S12 and S13 is to split a text (namely, "parsing" hereinafter), and perform analysis and information extraction on a single word. A task of step S14 is to combine nodes based on information in the nodes, and a node obtained through combination describes a relatively complex language material (a phrase or a sentence) that has a grammar structure. After one or more times of combination, one or more combined nodes may be obtained, and these combined nodes from a second node set. Node combination is based on the rules in the rule database. For the rules, a node generation rule may be set based on a grammar rule of a language of the unstructured text data. The grammar rule includes a word combination manner, a word type, and a rule on how to express semantics.

In some examples, the unstructured text data may be segmented into a plurality of subtexts, and then the processing in steps S12 to S14 is performed on the subtexts one by one. For example, a subtext may be a clause, a sentence, a paragraph, or the like. For example, one word set is generated for each subtext. In some other examples, one word set may be generated for an entire unstructured text data. In some examples, a separation mark may be added to a word set corresponding to an entire unstructured text data, to mark starting positions of the subtexts. When a first node set corresponding to the word set is generated, a separation node may be similarly added to the first node set, and a node between two adjacent separation nodes corresponds to one subtext.

Step S142: Output, as structured information, attribute names and attribute values of attributes of a node that is in the second node set and that has a root node role.

Each rule designates a role of a node generated by using the rule, for example, a root node or a non-root node. The non-root node describes a text having incomplete semantics, and the root node describes a text having complete semantics, for example, a clause, a simple sentence, a sentence of two or more clauses, or a paragraph. Whether a node generated by using each rule is a root node is determined by using a grammar rule on which the rule is based. For example, when an attribute of a node includes a description of person, time, site, or behavior, the node may serve as a root node. A role of a node may be represented by using an attribute value of an attribute of the node. For example, when an attribute value of an attribute "role" of a node is "root", it indicates that the node is a root node.

The second node set may include one or more root nodes. For example, when the second node set corresponds to a subtext, such as a sentence, in the unstructured text data, the second node set may include a root node. For another example, when the second node set corresponds to an entire unstructured text data, the second node set may include a plurality of root nodes, and each root node corresponds to a subtext in the unstructured text data. The root node includes a plurality of attributes, and an attribute value of a specified attribute may be extracted based on a preset extraction rule, and outputted in a form of structured data. The structured data that is outputted may be stored as data in a preset format, such as JavaScript Object Notation (JSON) data. The structured data that is outputted may be stored into a preset storage device, for subsequent query and use. The extracted structured data may be applied to various scenarios, such as data digging and knowledge map creation.

According to the technical solutions in the embodiments of this application, an unstructured text data may be segmented into words, these words are described by using structured data, and then the structured data may be combined by using a preset rule, to obtain a root node that describes the unstructured text data, and use the structured data in the root node as extracted structured data. Extraction logic is based on the preset rule, and has relatively low costs because a large quantity of tagging and extraction model training are not needed.

In some embodiments, in step S122, a node corresponding to each word in the word set may be generated, where the node includes a first attribute, an attribute value of the first attribute is a character string corresponding to the word; a first node set may be generated, where the first node set includes a node corresponding to each word in the word set.

In some embodiments, in step S122, a second attribute may be further set in the node corresponding to each word, where an attribute value of the second attribute represents a word type. The type of word (or a word type) may include a noun, a verb, a preposition, an adverb, an adjective, or the like.

In some embodiments, in step S122, a first word having a preset content type may be further identified in the word set. The preset content type is selected from: person name, location name, date, time, and proper noun. Then, the preset content type is represented by using a node name of a node corresponding to the first word or an attribute value of a third attribute.

In some embodiments, in step S122, a text of the first word may be further converted into a target text in a specified format corresponding to the preset content type; a fourth attribute is added to a preprocessing node corresponding to the first word, where an attribute value of the fourth attribute is the target text. For example, a text of a word of a date type identified may be converted into a text in a preset date format. For example, "Jun. 23, 2008" is converted into "2008-6-23".

In some embodiments, each rule in the rule database includes descriptions of one or more input nodes and a manner of generating an output node by using the one or more input nodes. In step S141, at least one node may be selected from the first node set, and the rule database may be searched for a rule, where an input node of the rule matches the at least one node. The at least one node is used as the input node of the rule, a second node is generated in a manner in the rule, and the at least one node is replaced in the first node set with the second node. A processing step herein may be repeated one or more times. The first node set processed as above is used as the second node set. When a node is selected from the first node set, in some examples, various node combinations including one or more nodes may be traversed. In some examples, only a node combination including adjacent nodes may be selected. A node selection manner is not limited herein, and the selection manner may be designed as required.

In some embodiments, in a rule, descriptions of one or more input nodes may include at least one of the following: a condition that an attribute value of a specified attribute of one input node in the one or more input nodes needs to satisfy; and an arrangement sequence of the one or more input nodes.

In some embodiments, in a rule, a manner of generating an output node by using the one or more input nodes may include at least one of the following: using an attribute value of a specified attribute of one node in the one or more input nodes as an attribute value of a specified attribute of the output node; and combining attribute values of specified attributes of at least two nodes in the one or more input nodes to obtain a combined value, and using the combined value as the attribute value of the specified attribute of the output node.

In some embodiments, when attribute values of specified attributes of the at least two nodes in the rule are character strings, a manner of combining the attribute values of the specified attributes of the at least two nodes to obtain a combined value may include: combining the attribute values of the specified attributes of the at least two nodes into a character string or a character string array in a combination manner specified by the rule. The combination manner may include one of the following: splicing a first character string into a second character string; or combining a first character string into a character string array, and using each first character string as an element in the character string array.

In some embodiments, the rule database may include information about a priority of each rule, and when the rule database is searched for a rule, the rule may be searched for in descending order of priorities of rules.

Figure 2:
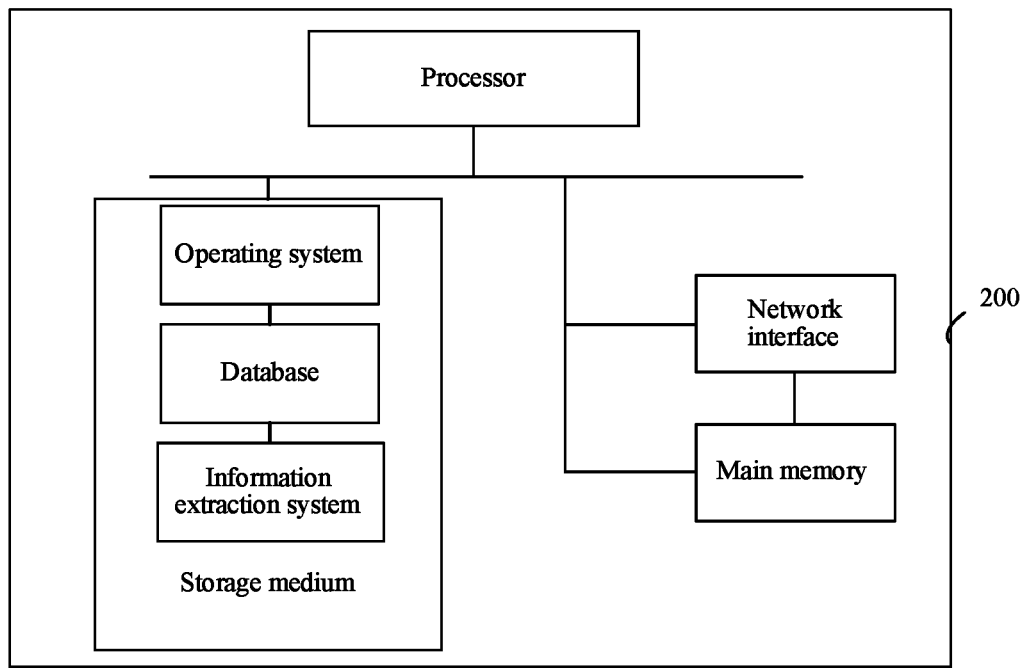
FIG. 2 is a schematic diagram of an internal structure of a server according to some embodiments of the present disclosure.

FIG. 2 is a schematic diagram of a computing device 200 according to embodiments of this application. As shown in FIG. 2, the computing device 200 includes a processor and a storage medium. The storage medium stores an information extraction system. The information extraction system may be implemented by using a computer readable instruction. The information extraction system may perform the information extraction method in the embodiments of this application, to extract structured data in an unstructured text data. In some examples, the computing device 200 may include one or more physical devices, such as a distributed computing system and a server cluster.

Figure 3A:
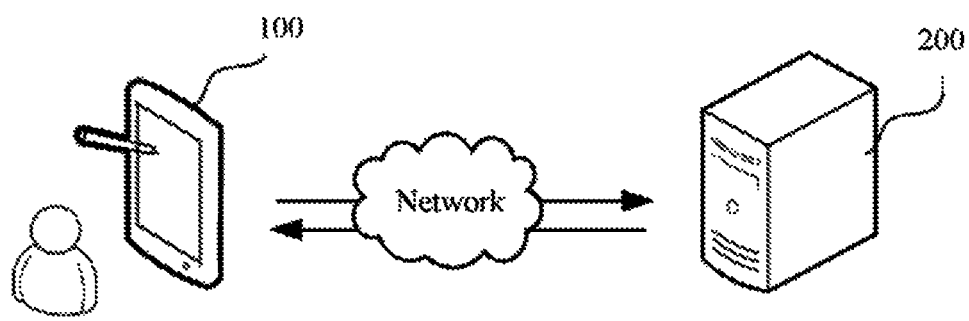
FIG. 3a is a schematic diagram of an application scenario of an information extraction method according to some embodiments of the present disclosure.

FIG. 3a is a schematic diagram of an example of an application scenario of an information extraction method according to embodiments of this application. As shown in FIG. 3a, a terminal 100 communicates with a server 200 by using a network. The terminal 100 can receive a text (to be specific, an unstructured text data) entered by a user, and send the text to the server 200 by using the network. The server 200 performs information extraction on the text, to form structured extracted information (namely, structured data), thereby implementing standardized and automated management of a document. The server 200 can further send an extraction result to the terminal 100 for display. The terminal 100 may be a smartphone, a tablet computer, a personal digital assistant (PDA), and a personal computer. The server 200 may be an independent physical server or physical server cluster.

A structure of the server 200 may be shown in FIG. 2. For example, the server 200 may include a processor, a storage medium, a main memory, and a network interface that are linked to each other by using a system bus. A storage medium of the server 200 stores an operating system, a database, and an information extraction system. The database is configured to store data, such as a node format for information extraction and a node synthesis rule (namely, a rule in a rule database). A processor of the server 200 is configured to provide computing and control capabilities, to support running of the entire accessed server 200. The main memory of the server 200 provides an environment for running of the information extraction system in the storage medium. The network interface of the server 200 is configured to communicate with the external terminal 100 by using the network, for example, receive a to-be-extracted text sent by the terminal 100.

Figure 3B:
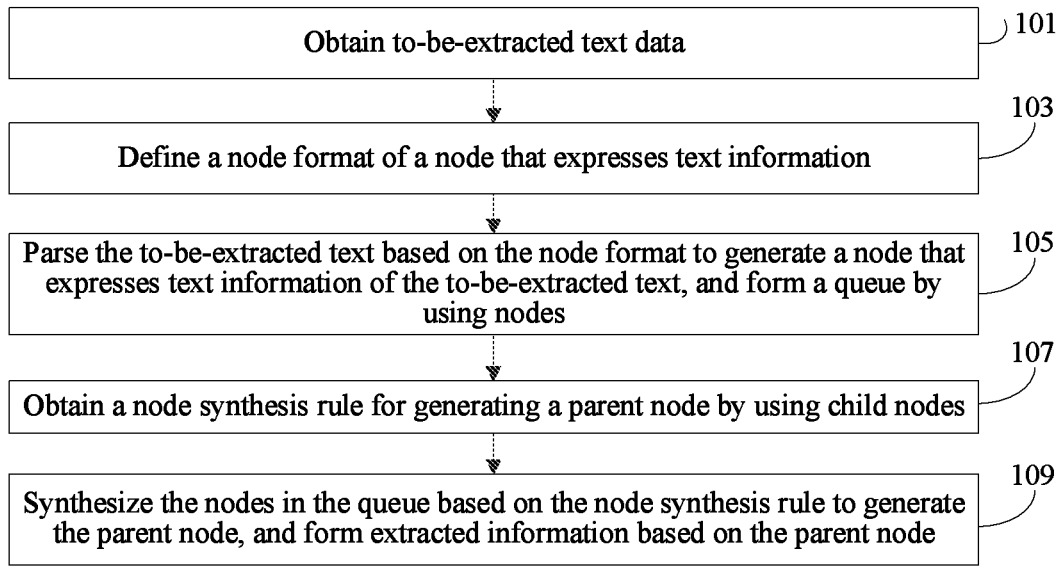
FIG. 3b is a flowchart of an information extraction method according to some embodiments of the present disclosure.

FIG. 3b is a flowchart of an information extraction method according to embodiments of this application. The method may be applied to the server shown in FIG. 2. The method may include the following steps:

Step 101: Obtain a to-be-extracted text.

The to-be-extracted text may be any text data including characters, or may be semi-structured Web data or text data without a structure (namely, an unstructured text data). The obtaining a to-be-extracted text includes obtaining text data displayed in a specified application program, for example, text data released on a specified website and text data released on a specified information release platform.

Step 103: Define a node format of a node that expresses text information.

Herein, the "defining a node format of a node that expresses text information" means obtaining, as a node format of a subsequently generated node, a pre-defined node format or an output node format that is defined by each rule in a rule database. The node is a basic unit that expresses text information. Each node has a unified node format. Text information is grouped in the same node format, text information is attached in each node having the same node format, and the text information included in the node is identified by using a unified rule, so that it is convenient to set an operation rule for the text information for processing, to implement extraction of the text information.

Step 105: Parse the to-be-extracted text based on the node format to generate nodes that express text information of the to-be-extracted text, and form a queue by using the nodes.

The to-be-extracted text is parsed into nodes that are in a preset format and that have attached text information, for expression. Generally, the to-be-extracted text is parsed by using a sentence as a unit, each sentence is parsed into a plurality of nodes that express text information, and a queue is correspondingly formed. In this embodiment, a first node set is implemented by using a queue. In an example, the parsing step herein may include the foregoing steps S12 and S13.

Step 107: Obtain a node synthesis rule for generating a parent node by using a child node.

The node synthesis rule is that a node is processed based on an operation rule, and text information expressed by a plurality of nodes (namely, input nodes) is synthesized based on the operation rule to form a new node (namely, an output node), that is, descriptions of one or more input nodes and a manner of generating an output node by using the one or more input nodes. The plurality of nodes is respectively child nodes, the formed new node is correspondingly a parent node, and the parent node includes summative text information of text information included in the plurality of nodes. Each node synthesis rule includes a correspondence between a parent node and a child node. The obtaining a node synthesis rule may be specifically implemented by providing an extractor interface. A custom node synthesis rule of a user is received by using the extractor interface. When a node synthesis rule needs to be added for different to-be-extracted texts, a class may be defined to implement the extractor interface. In some embodiments, by using the extractor interface, a to-be-extracted text may be further obtained as a parameter, and a needed extraction result may be generated based on the node synthesis rule.

Step 109: Synthesize the nodes in the queue based on the node synthesis rule to generate the parent node, and form extracted information based on the parent node.

Matching is performed between the node in the queue and the node synthesis rule in turn, and a corresponding node is synthesized based on a matching result by using the node synthesis rule, to generate the parent node. Each parent node includes summative text information obtained by synthesizing, based on at least one node synthesis rule, text information included in the child node. A parent node generated based on one node synthesis rule may serve as a child node in another node synthesis rule, so that by defining different node synthesis rules, transmission of information extraction can be implemented by using the correspondence between the parent node and the child node step by step. In this way, to-be-extracted text extraction can be implemented to obtain corresponding extracted information. An information tree including text information and an extraction result of a to-be-extracted text can be formed based on a transitive relationship between nodes with text information attached. Final extracted information is stored in a parent node at the top of the information tree, and the parent node at the top of the information tree is a root node.

According to the information extraction method provided in the embodiment, the node format of the node that expresses the text information and the node synthesis rule for generating the parent node by using the child nodes are obtained, so that the to-be-extracted text is parsed into the nodes that express the text information in the preset node format, where the node synthesis rule may be customized based on the information extraction result, and the correspondence between the plurality of child nodes and the parent node is expressed by using the node synthesis rule. In this way, text information expressed by the child nodes can be synthesized based on the node synthesis rule to obtain the parent node including the summative text information, and the transmission of information extraction can be implemented by using the correspondence between the parent node and the child nodes step by step, to obtain the final extracted information. The information extraction according to the information extraction method is not limited by a structure of data in the to-be-extracted text, and the node synthesis rule can be customized and supplemented based on a requirement of an individual special and complex text. Entire extraction implementation logic is easy to understand, and this allows convenient and real-time extension and does not require training of an extraction model by using a large quantity of tagging, thereby having relatively low costs of implementation.

Figure 4:
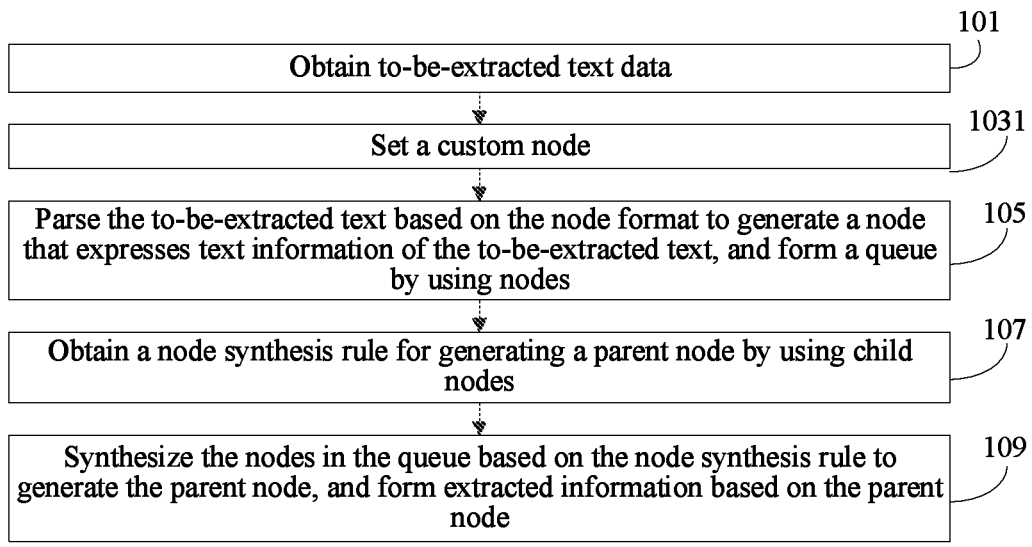
FIG. 4 is a flowchart of an information extraction method according to some embodiments of the present disclosure.

FIG. 4 is a flowchart of an information extraction method according to embodiments of this application. As shown in FIG. 4, in step 103 of FIG. 3b, the defining a node format of a node that expresses text information may include the following steps:

Step 1031: Set a custom node.

In this document, "setting  node" means setting a node name or an attribute of a node to a specified value, so that the node has a form of the  node, similarly hereinafter.

A node format of the custom node is that each custom node is identified by using a first identification symbol. Node content of each custom node includes a node name and text information that is expressed by using a correspondence between a text information attribute (namely, an attribute of the node) and a text information attribute value (namely, an attribute value of the node attribute). The correspondence between the text information attribute and the corresponding text information attribute value is identified by using a second identification symbol. Each text information attribute value is identified by using a third identification symbol.

Each custom node is identified by using a first identification symbol, so that different custom nodes can be distinguished by using the first identification symbol. Text information attached to each custom node is expressed by using the correspondence between the text information attribute and the text information attribute value. The correspondence between the text information attribute and the corresponding text information attribute value is identified by using the second identification symbol, so that different text information included in node content can be separated by using the second identification symbol. Each text information attribute value is identified by using the third identification symbol, so that the text information attribute and the text information attribute value can be distinguished by using the third identification symbol. Node content of each custom node may include text information expressed by using a correspondence between a plurality of text information attributes and a text information attribute value. Different correspondences between the text information attribute and the text information attribute value are generally separated by using a preset symbol. In some embodiments, the preset symbol is a space, and the node name is any character string that does not include a space.

In a specific embodiment, the first identification symbol is angle brackets (< >), in other words, each custom node is enclosed in angle brackets; the second identification symbol is an equal sign (=), in other words, each text information attribute is connected to a corresponding text information attribute value by using an equal sign; the third identification symbol is double quotation marks (" "), in other words, each text information attribute value is enclosed in double quotation marks, and then an expression form of a node whose node name is A is: <A attr1="value1">, where A is the node name, attr1 is a text information attribute, and value1 is a text information attribute value. In some embodiments, in each correspondence between the text information attribute and the text information attribute value, when only an attribute name is included and no text information attribute value is written, the text information attribute value is true "true" by default. For example, an expression form of a node whose node name is event is: <event root>, where event is the node name, root is the text information attribute, and the text information attribute value is "true".

The node format of the node is set, where the node content in the node format includes the node name and the text information that is expressed by using the correspondence between the text information attribute and the text information attribute value, so that an expression format of the text information is close to a general thinking and understanding mode, and easy to understand. This makes it convenient to parse the text information into nodes by using a node format that is set, for expression. Type of word (or a word type) information is introduced into a manner of expressing the text information by using the text information attribute and the text information attribute value, so that it is convenient to subsequently set an extraction rule for the text information with the help of the type of word (or a word type) information.

Figure 5:
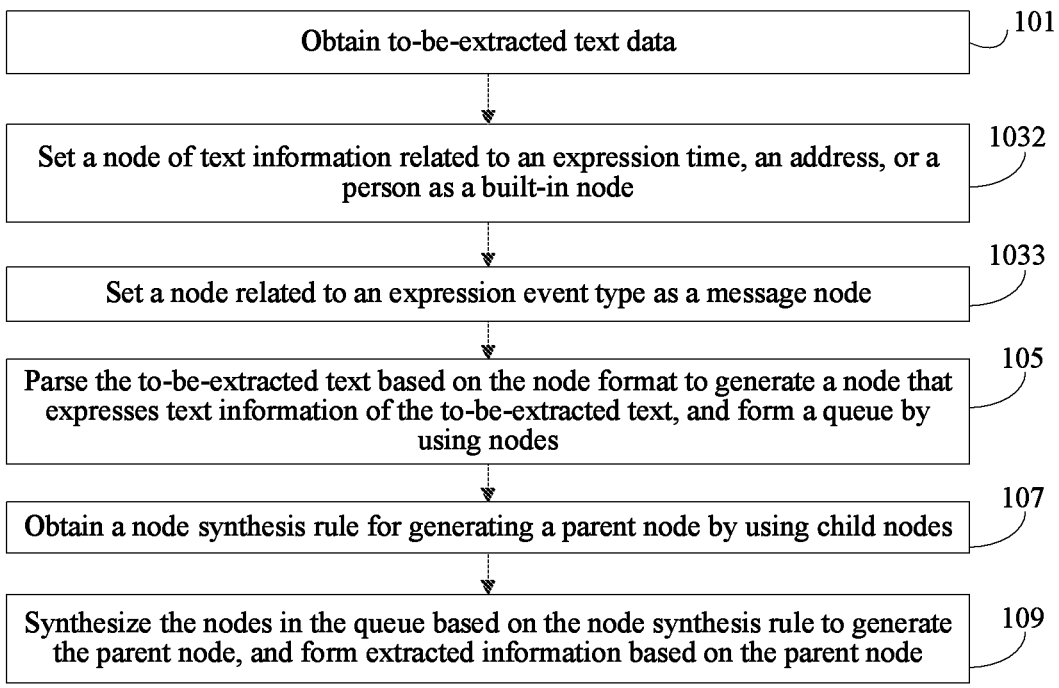
FIG. 5 is a flowchart of an information extraction method according to some embodiments of the present disclosure.

FIG. 5 is a flowchart of an information extraction method according to embodiments of this application. As shown in FIG. 5, in step 1031 in FIG. 4, the step of setting a custom node may include the following steps:

Step 1032: Set a node of text information related to an expression time, an address, or a person as a built-in node.

Step 1033: Set a node of text information related to an expression event type as a message node.

The custom node includes the built-in node and the message node. The built-in node includes a node of frequently-used text information, such as time, address, person, or proper noun. For example, a node of text information related to an expression time, an address, or a person may be separately set as a built-in node. A node that has attached text information related to time is set as a time built-in node, such as <time>, where time is a node name of the time built-in node. A node that has attached text information related to an address is set as an address built-in node, such as <location>, where location is a node name of the address built-in node. A node that has attached text information related to a person is set as a person built-in node, such as <people>, where people is a node name of the person built-in node. The time, address, and person are generally information necessarily displayed in an information extraction result; therefore by setting, as the built-in node, the node that expresses the text information related to the time, address, or person, text information related to time, an address, or a person included in a to-be-extracted text can be automatically identified, and a time built-in node, an address built-in node, and a person built-in node may be correspondingly generated through parsing.

The message node includes a node of event-type text information. By setting the message node, text information related to an event type in a to-be-extracted text can be automatically identified, and the message node is correspondingly generated through parsing. A node name of the message node is a message, such as <word>, where word is the node name of the message node. The message node is an initial parsing node for the to-be-extracted text, and is a node that is generated for expressing text information related to a description of a parsing event type. A information tree is formed by using a node, to express an information extraction process of a to-be-extracted text, and the information tree includes a mapping relationship between a child node and a parent node. Some nodes are both child nodes and parent nodes on different levels in the tree, and a parent node located at the top of the information tree does not serve as a child node of any node and is a root node. A child node at the bottom of the information tree does not serve as a parent node of any node and is a leaf child node. The message node is a leaf child node.

By setting a custom node type to include the built-in node and the message node, text information included in a to-be-extracted text can be parsed to generate a node queue in which a node expresses the text information, so that an operation may be performed on a node by using a preset grammar rule, to extract text information attached to the node.

Figure 6:
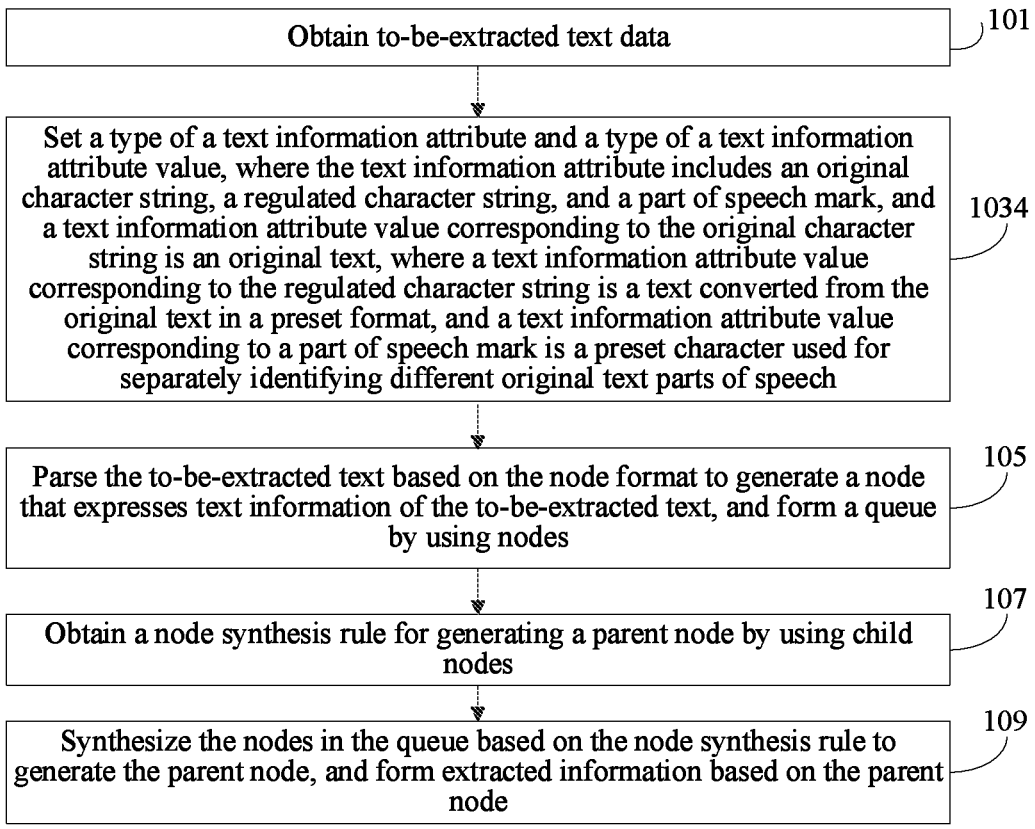
FIG. 6 is a flowchart of an information extraction method according to some embodiments of the present disclosure.

FIG. 6 is a flowchart of an information extraction method according to embodiments of this application. As shown in FIG. 6, in step 103 of FIG. 3b, the step of defining a node format of a node that expresses text information may include the following steps:

Step 1034: Set a type of a text information attribute and a type of a text information attribute value, where the text information attribute includes an original character string, a regulated character string, and a type of word (or a word type) mark, and a text information attribute value corresponding to the original character string is an original text. A text information attribute value corresponding to the regulated character string is a text converted from the original text in a preset format, and a text information attribute value corresponding to a type of word (or a word type) mark is a preset character used for separately identifying different original text parts of speech.

Text information attributes of nodes having different attached text information are pre-defined, to set the type of the text information attribute and the type of the text information attribute value. The text information attribute mainly includes the original character string, the regulated character string, and the type of word (or a word type) mark. The original character string indicates that a corresponding text information attribute value is an original text in the to-be-extracted text, such as <people original="Andy Lau">, where original indicates that the text information attribute is an original character string, and a text information attribute value corresponding to it is the original text "Andy Lau" in the to-be-extracted text. The regulated character string indicates that a corresponding text information attribute value is a text converted from the original text in the to-be-extracted text in the preset format, such as <time text="2008-06-23">, where text indicates that the text information attribute is the regulated character string, and a text information attribute value corresponding to it is the text "2008-06-23" converted from the original text "Jun. 23, 2008"; in the to-be-extracted text. The type of word (or a word type) mark is parts of speech of different original texts in the to-be-extracted text, a text information attribute value corresponding to it is a preset character for distinguishing between the different parts of speech, such as <word pos="cc">, where pos indicates that the text information attribute is a type of word (or a word type) mark, and a text information attribute value corresponding to it is a preset character cc, and is used for indicating that a type of word (or a word type) of text information attached to the node is cc. Setting of the preset character is mainly for the convenience of memorizing and distinguishing between parts of speech, and a character quantity and a setting rule of it may be randomly set. By setting the text information attribute to include the original character string, the regulated character string, and the type of word (or a word type) mark, in a process of parsing the to-be-extracted text to generate a node, identification can be performed based on a corresponding attribute of text information attached to each node, to define, in the node synthesis rule, a node synthesis operation condition by using the unified text information attribute.

Figure 7:
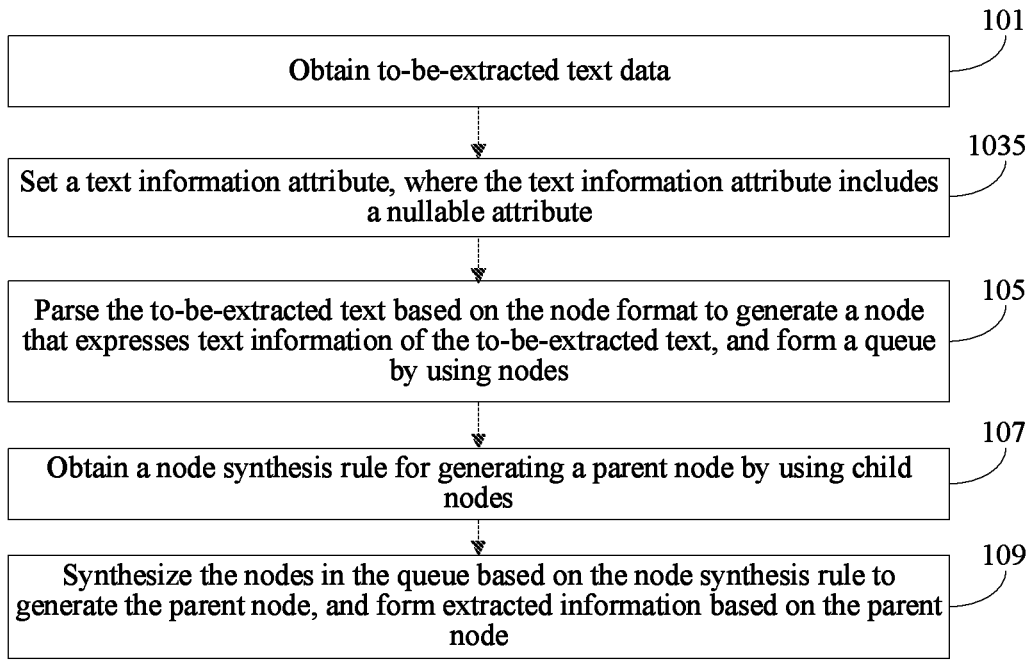
FIG. 7 is a flowchart of an information extraction method according to some embodiments of the present disclosure.

FIG. 7 is a flowchart of an information extraction method according to embodiments of this application. As shown in FIG. 7, in step 103 of FIG. 3b, the step of defining a node format of a node that expresses text information may include the following steps:

Step 1035: Set a text information attribute, where the text information attribute includes a nullable attribute.

A text information attribute value corresponding to the nullable attribute is generally true "true", and the text information attribute value corresponding to the nullable attribute is generally not written but is expressed in a default manner. The text information attribute is a nullable attribute, expressing that a corresponding node may be null, that is, may be a nullable node. In an embodiment, the nullable attribute is represented by using orEmpty, such as <and orEmpty>, where a node whose node name is and is a nullable node. A node of the nullable attribute may be applied to the node synthesis rule, to indicate an input node. By setting an input node as a nullable node, the node synthesis rule expresses that text information attached in the input node may be omitted, in other words, the input node may not exist.

Figure 8:
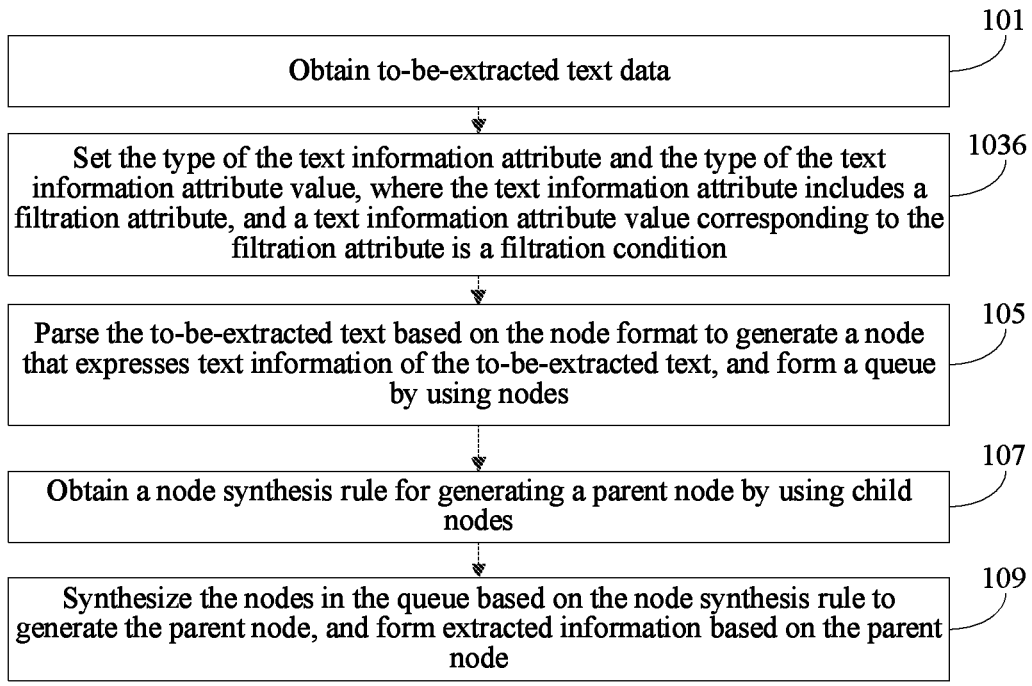
FIG. 8 is a flowchart of an information extraction method according to some embodiments of the present disclosure.

FIG. 8 is a flowchart of an information extraction method according to embodiments of this application. As shown in FIG. 8, in step 103 of FIG. 3b, the step of defining a node format of a node that expresses text information may include the following steps:

Step 1036: Set the type of the text information attribute and the type of the text information attribute value, where the text information attribute includes a filtration attribute, and a text information attribute value corresponding to the filtration attribute is a filtration condition. In the node synthesis rule, an attribute of the input node may include the filtration attribute. The text information attribute value corresponding to the filtration attribute is content included in a specific filtration condition. A filtration relationship expressed by using the filtration attribute and the text information attribute value corresponding to the filtration attribute includes being equal or being not equal, and a node whose text information attribute is the filtration attribute is a filtration node. In an embodiment, an attribute name of the filtration attribute is represented by using $pos, an equal relationship is represented by using (=), and a not equal relationship is represented by using (!=), such as <B $pos="nr">, or <C $pos!="adj">, where both a node whose node name is B and a node whose node name is C are filtration nodes, indicating that a text information attribute value of a type of word (or a word type) mark of a node <B> needs to be nr, and a text information attribute value of a type of word (or a word type) mark of a node <C> cannot be adj. A condition that the text information attached in the input node needs to satisfy is expressed by using the filtration attribute that can be used for setting the input node in the node synthesis rule, for example, needing to be the same as or different from a specified value in the filtration condition, to implement matching of different conditions.

It may be understood that, a plurality of filtration attributes may be defined for one node, and a relationship between a plurality of filtration conditions may be an "and" or "or" relationship.

In some embodiments, in step 103, the step of defining a node format of a node that expresses text information may include: setting a text information attribute, where the text information attribute includes a root node attribute. A text information attribute value corresponding to the root node attribute is generally true "true", and the text information attribute value corresponding to the root node attribute is generally not written but is expressed in a default manner. The text information attribute is a root node attribute, expressing that a corresponding node is a root node. In an embodiment, the root node attribute is represented by using root, such as <marry node>, where a node whose node name is marry is a root node. The root node is set, to express, in the node synthesis rule by using the root node, that text information attached in a corresponding node is final extracted information.

In some embodiments, in step 103, the step of defining a node format of a node that expresses text information may include: setting a text information attribute, where the text information attribute includes a priority attribute. A text information attribute value corresponding to the priority attribute is generally a numerical value. A priority of the node synthesis rule is expressed by using the priority attribute and the text information attribute value corresponding to the priority attribute. In an embodiment, the priority attribute is represented by using level, such as <level="1">. Generally, priorities may successively decrease from 1 to 10. In a process of generating a parent node based on a node synthesis rule by using a plurality of child nodes, if a plurality of node synthesis rules is hit at the same time, a node synthesis rule whose priority is higher is performed first.

In some embodiments, in step 1031, the step of setting a custom node may include: setting, as a beginning node, a node that expresses a beginning of a to-be-extracted text; and setting, as an end node, a node that expresses an end of the to-be-extracted text.

Generally, the to-be-extracted text is parsed by using a sentence as a unit, each sentence is parsed into a form of expressing text information by using a plurality of nodes, and a queue is correspondingly formed. The beginning node is correspondingly located at the head of a node queue formed by a sentence, and the end node is correspondingly located at the end of the node queue formed by the sentence. When the to-be-extracted text includes a plurality of sentences or paragraphs, the to-be-extracted text may be parsed by using the sentence or the paragraph as a unit, to generate a node queue, and the paragraphs may be divided by using the beginning node and the end node.

Figure 9:
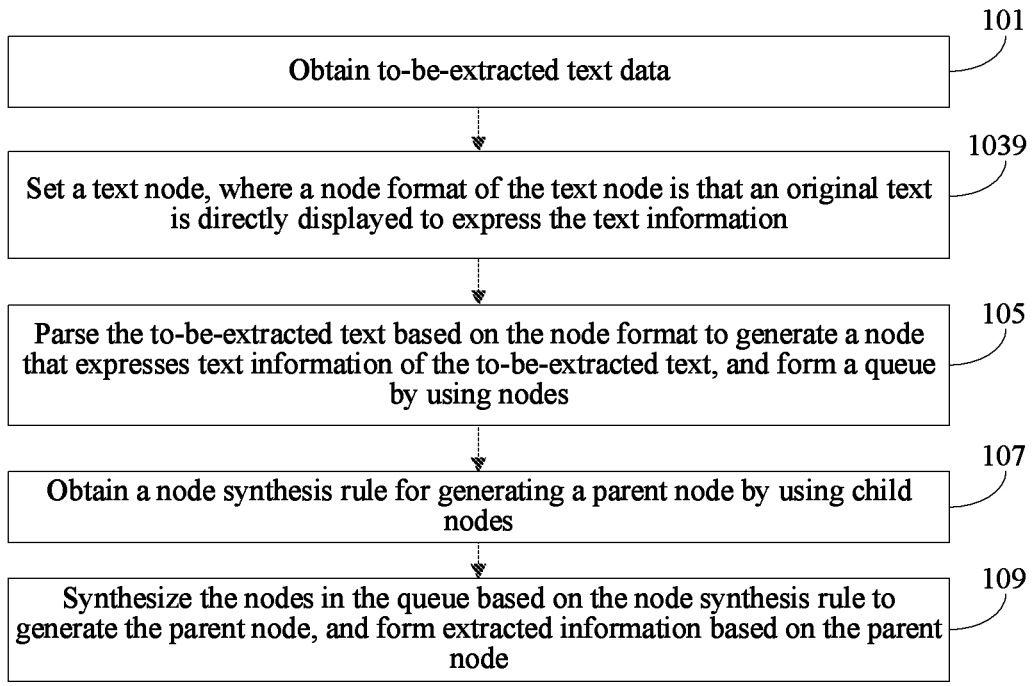
FIG. 9 is a flowchart of an information extraction method according to some embodiments of the present disclosure.

In some embodiments, FIG. 9 is a flowchart of an information extraction method according to embodiments of this application. As shown in FIG. 9, in step 103 of FIG. 3b, the step of defining a node format of a node that expresses text information includes the following steps:

Step 1039: Set a text node, where a node format of the text node is that an original text is directly displayed to express the text information.

The text node means that the original text is directly displayed in a node list that is generated by parsing a to-be-extracted text. The text node is different from the custom node, and does not require an identification symbol to be set for distinguishing. For example, a to-be-extracted text includes "of", to be directly displayed, by using a text node "of", in a node queue that is generated by parsing the to-be-extracted text. Based on the definitions of the message node and the original character string in the text information attribute, the text node may also be equivalent to a message node whose text information attribute value is an original text. In an embodiment, the text node "of" is equivalent to a message node <word text="of">. A meaning of the text node is a text, and no other attached text information attribute is attached. Setting of the text node can simplify expressions formed by some nodes when the node queue is formed by parsing the to-be-extracted text, so that after the parsing, it is easier to understand when a node expresses text information.

Figure 10:
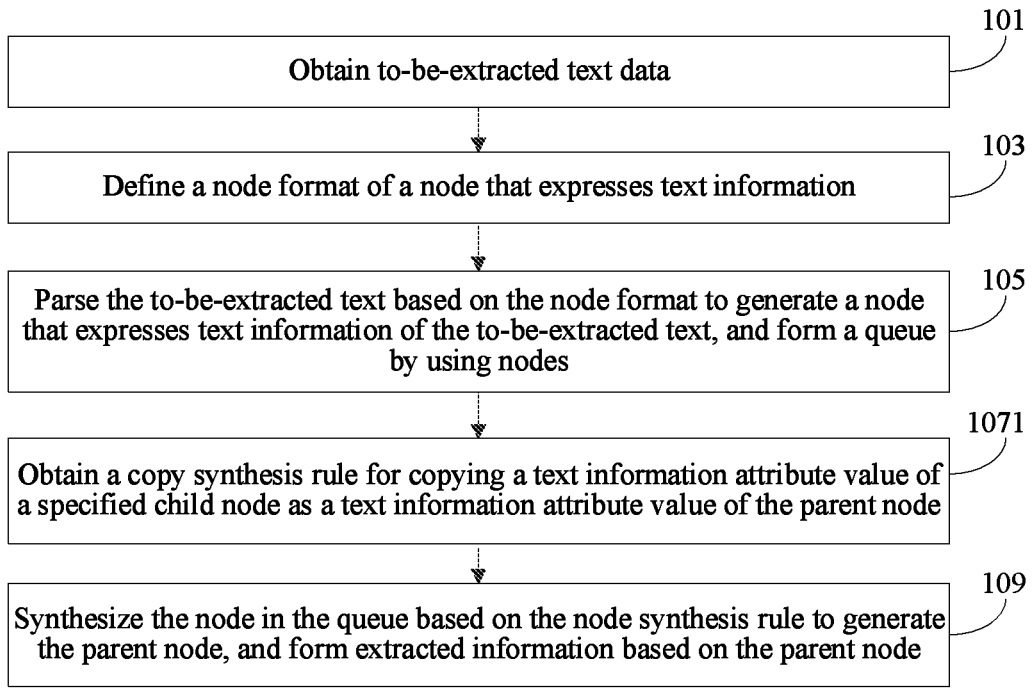
FIG. 10 is a flowchart of an information extraction method according to some embodiments of the present disclosure.

In some embodiments, FIG. 10 shows an information extraction method according to embodiments of this application. A node format of a node includes expressing text information by using a correspondence between a text information attribute and a text information attribute value. In step 107, the step of obtaining a node synthesis rule for generating a parent node by using child nodes may include the following step:

Step 1071: Obtain a copy synthesis rule for copying a text information attribute value of a specified child node as a text information attribute value of the parent node.

A parent node and a child node included in each node synthesis rule are distinguished from each other by using a preset fourth identification symbol. In each node synthesis rule, the parent node is located to the left of the fourth identification symbol, the child node is located to the right of the fourth identification symbol, and by using the fourth identification symbol, the node synthesis rule is separated into two parts: a left part and a right part. In an embodiment, the fourth identification symbol is (:=), such as <A>:=<B> <C> <D>, indicating that a node synthesis rule for synthesizing three child nodes <B> <C> <D> into a parent node <A>.

The copy synthesis rule means copying a text information attribute value of a specified child node as a text information attribute value of a parent node, to complete extraction of text information attached to the child node, to form the parent node. The text information attribute value of the parent node in the copy synthesis rule is represented by using a preset fifth identification symbol. In an embodiment, a fifth identification symbol is $+digit, where the digit indicates that a text information attribute value of a child node corresponding to the digit is copied. For example, <A attr1="$1">:=<B> <C> <D> indicates that child nodes <B> <C> <D> are synthesized into a parent node <A> by using the copy synthesis rule. The fifth identification symbol $1 indicates that a text information attribute value of a first child node, namely, the node <B>, in nodes on the right is used as a text information attribute value of a text information attribute attr1 of the node <A>.

Figure 11:
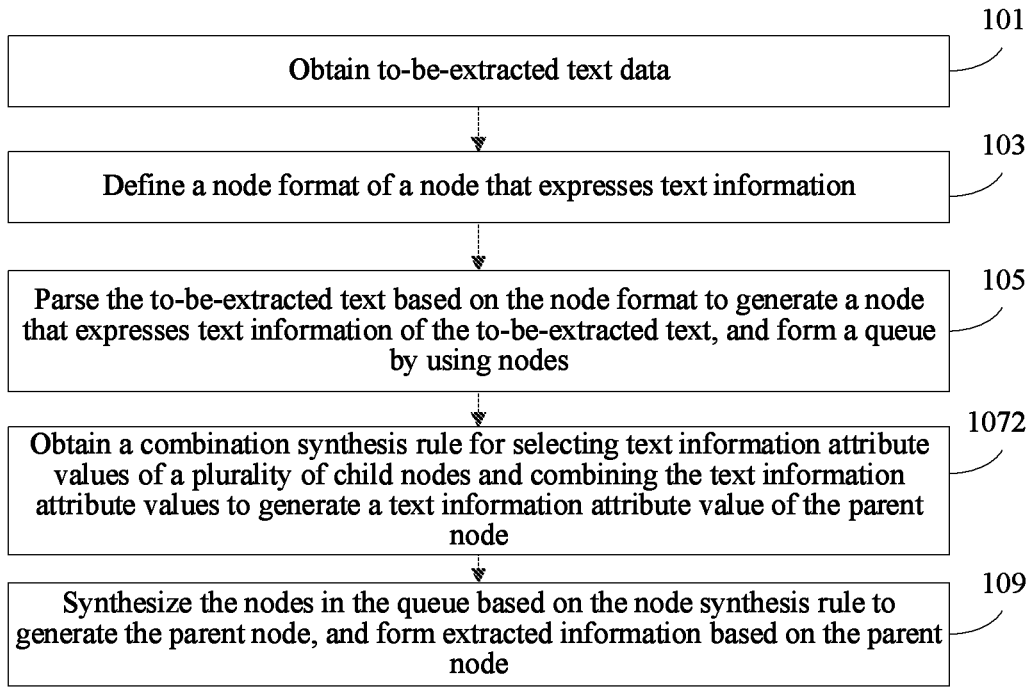
FIG. 11 is a flowchart of an information extraction method according to some embodiments of the present disclosure.

In some embodiments, FIG. 11 is a flowchart of an information extraction method according to embodiments of this application. A node format of a node includes expressing text information by using a correspondence between a text information attribute and a text information attribute value. In step 107, the step of obtaining a node synthesis rule for generating a parent node by using child nodes may include the following step:

Step 1072: Obtain a combination synthesis rule for selecting text information attribute values of a plurality of child nodes and combining the text information attribute values to generate a text information attribute value of the parent node.

The combination synthesis rule means combining text information attribute values of a plurality of specified child node as a text information attribute value of the parent node, to complete extraction of text information attached to the child node, to form the parent node. The text information attribute value of the parent node in the combination synthesis rule is represented by using a preset sixth identification symbol. In an embodiment, the sixth identification symbol is $join+index list, where the index list includes a plurality of digits separated by using a preset identification symbol, and the digits indicate that text information attribute values of child nodes corresponding to the plurality of digits are combined. For example, <A attr1="$join 1,3">:=<B> <and> <C> indicates that child nodes <B> <and> <C> are synthesized into a parent node <A> by using the combination synthesis rule. A sixth identification symbol $join 1,3 indicates that text information attribute values of a first child node and a third child node, namely, child nodes <B> and <C>, are combined as a text information attribute value of a text information attribute attr1 of the node <A>. When the index list does not include a digit, in other words, to-be-combined child nodes are not designated, all child nodes are to be combined by default. A specified identification symbol may also indicate that the to-be-combined child nodes are all the child nodes. In an embodiment, the specified identification symbol is an underline (_). The preset identification symbol used for separating the plurality of digits in the index list also indicates a separation symbol used when the text information attribute values of the corresponding to-be-combined child nodes are synthesized into the text information attribute value of the parent node. On a page of the index list, a specified identification symbol may be used to indicate that no separation symbol is included when the text information attribute values of the to-be-combined child nodes are synthesized into the text information attribute value of the parent node. In an embodiment, the specified identification symbol is \empty.

Figure 12:
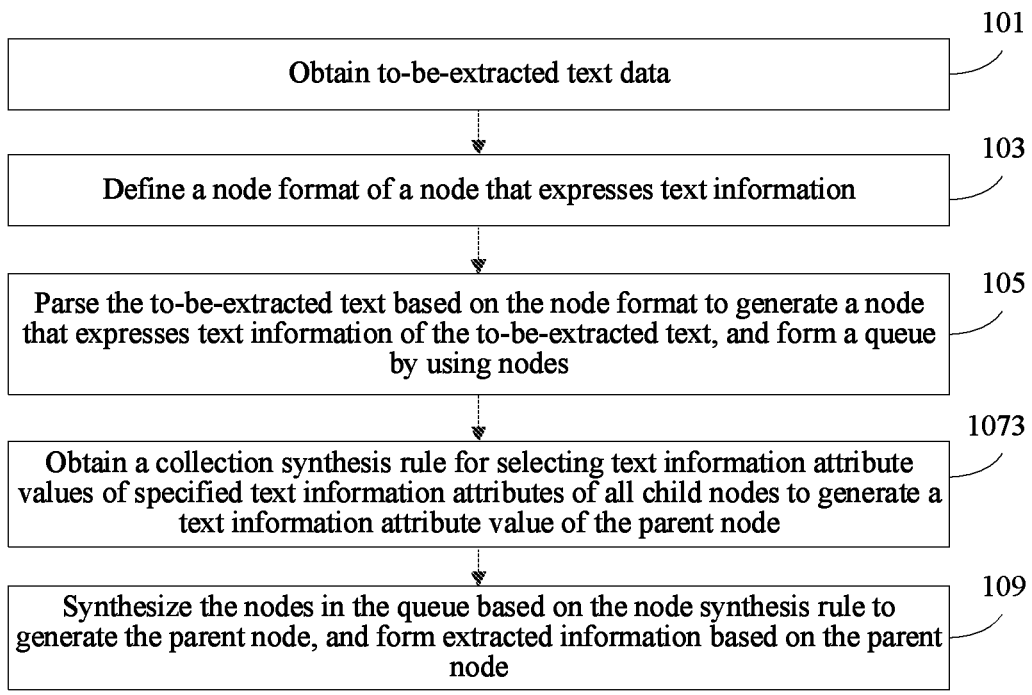
FIG. 12 is a flowchart of an information extraction method according to some embodiments of the present disclosure.

In some embodiments, FIG. 12 is a flowchart of an information extraction method according to embodiments of this application. A node format of a node includes expressing text information by using a correspondence between a text information attribute and a text information attribute value. In step 107, the step of obtaining a node synthesis rule for generating a parent node by using child nodes may include the following step:

Step 1073: Obtain a collection synthesis rule for selecting text information attribute values of specified text information attributes of all child nodes to generate a text information attribute value of the parent node.

All the child nodes include child nodes of the parent node generated in the node synthesis rule and child nodes of the child nodes. The collection synthesis rule means collecting the text information attribute values of the specified text information attributes of all the child nodes as the text information attribute value of the parent node, to complete extraction of text information attached to the child nodes to form the parent node. The text information attribute of the parent node in the collection synthesis rule is represented by using a preset seventh identification symbol, and a text information attribute value of the text information attribute is a text information attribute of a child node. A collection result completed, by using the collection synthesis rule, for a parent node formed through extraction of text information attached to a child node is a mapping table. The mapping table includes a mapping relationship between collected text information attributes of all the child nodes and corresponding text information attribute values. In an embodiment, the seventh identification symbol is collect. For example, <A collect="role">:=<B> <at> <T role="time" text="1984-11-25">

<B>:=<C role="participator" text="jack"> <and> <D role="participator" text="lucy">

A parent node <B> is generated by using a child node <C> and a child node <D>, and a node <A> indicates that a parent node <A> is generated based on the collection synthesis rule by using text information attribute values corresponding to text information attributes role of all the child nodes. A collection result for the parent node <A> is:

role.participator=[jack,lucy]
role.time=[1984-11-25]

In the foregoing embodiments, for the copy synthesis rule, the combination synthesis rule, and the collection synthesis rule that are included in the node synthesis rule, a definition of the node synthesis rule is separately implemented by using definitions of attribute values of the parent node. The node synthesis rule for generating a parent node by using child nodes is defined, and the parent node generates new information about the parent node based on information about the child node. The parent node may serve as a child node in another node synthesis rule, so that upward transmission of text information attached to the child node can be implemented, and finally results are gathered in a parent node at the top. In this way, sentences of a to-be-extracted text can be respectively parsed into information trees that have attached information, and a parent node at the top is a root node, and final extracted information is formed in the root node.

Figure 13:
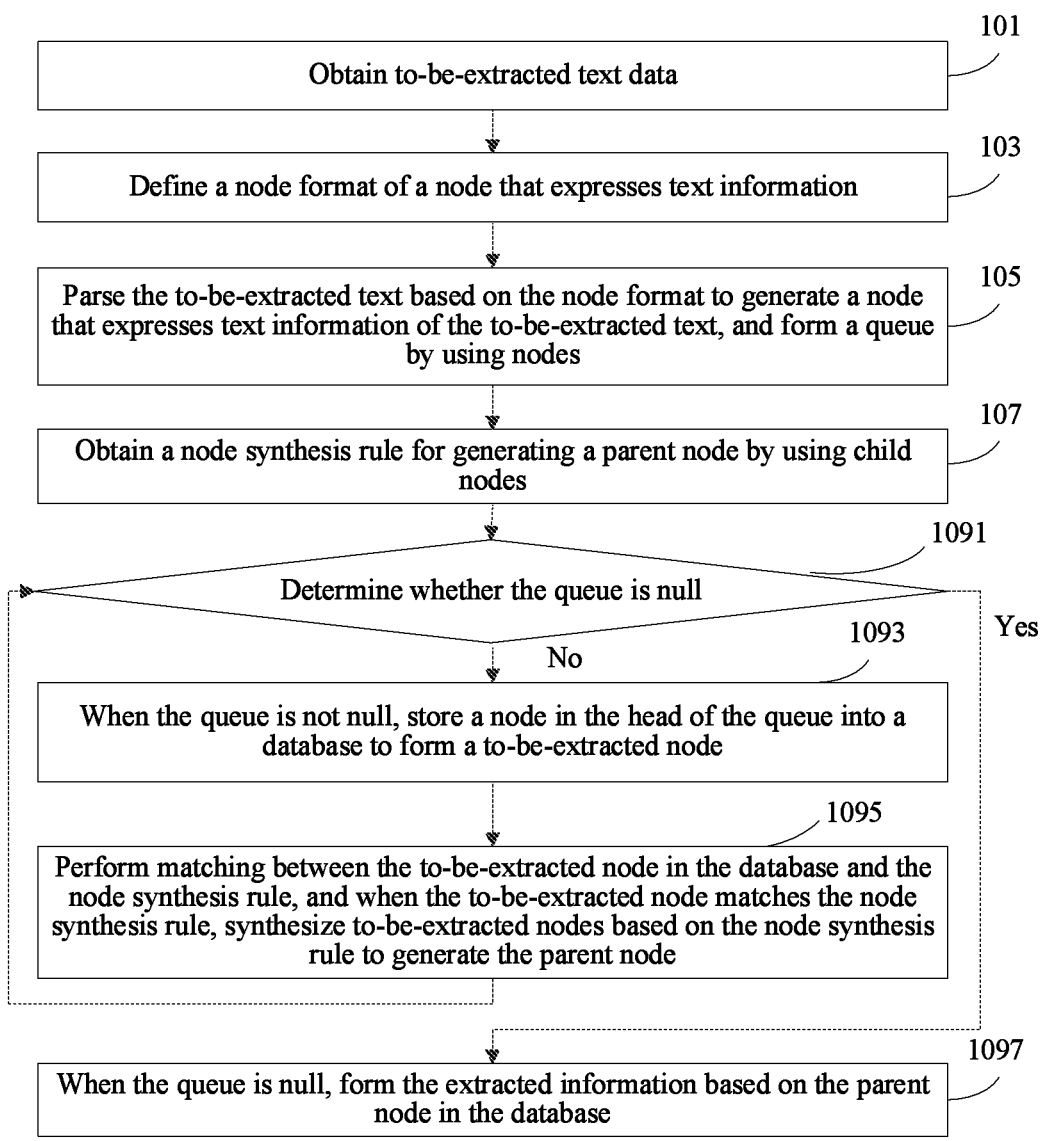
FIG. 13 is a flowchart of an information extraction method according to some embodiments of the present disclosure.

In some embodiments, FIG. 13 is a flowchart of an information extraction method according to embodiments of this application. In step 109, the step of synthesizing the node in the queue based on the node synthesis rule to generate the parent node, and form extracted information based on the parent node may include the following steps:

Step 1091: Determine whether the queue is null.

Step 1093: When the queue is not null, store a node in the head of the queue into a database to form a to-be-extracted node.

Step 1095: Perform matching between the to-be-extracted node in the database and the node synthesis rule, and when the to-be-extracted node matches the node synthesis rule, synthesize to-be-extracted nodes based on the node synthesis rule to generate the parent node, and perform the step of determining whether the queue is null.

Step 1097: When the queue is null, form the extracted information based on the parent node in the database.

Nodes in a node queue generated through parsing a to-be-extracted text are added to the database in turn, and the nodes included in the database are used as matching objects for the node synthesis rule, so that a principle of transmitting information extraction upward step by step can be implemented.

In some embodiments, the database is a stack, and before step 1091 of determining whether the queue is null, the method further includes the following step:

Step 1090: Initiate a stack.

Using an example in which the database is a stack, a specific embodiment of the principle of transmitting information extraction upward step by step is described as follows: after the initialization, the stack is stack=[ ], the node queue is queue=[word1, word2, . . . ]; whether the node queue is null is checked; when the node queue is not null, the first element of the node queue is pushed out, and placed into the stack; and whether elements in the stack comply with corresponding node synthesis rules is determined based on priorities of the node synthesis rules in turn. A specific determining method is: matching is performed between a stack header and a last item of a node synthesis rule, to determine whether both a node name and a filtration condition are matched; if both the node name and the filtration condition are matched or when a current node is a nullable node, matching continues to be performed on a previous item in the stack; if all nodes on the right of the node synthesis rule are matched, the matching succeeds, corresponding items in the stack are synthesized into a new node, the corresponding items are deleted from the stack, and the new node is pressed into the stack, a new node name is defined by a node on the left of the node synthesis rule, and a text information attribute value of the new node is generated based on an information transmission rule defined by the node synthesis rule; and when the node queue is null, a text information attribute and a text information attribute value included in a root node in the stack are extracted to form an extraction result, where the root node is the parent node at the top of the information tree. It may be understood that, when a to-be-extracted text includes relatively little text information, information extraction may be implemented for the to-be-extracted text by using one node synthesis rule, and text information attached to a parent node generated based on the node synthesis rule forms extracted information.

Using an example in which the to-be-extracted text is "Andy Lau and Liqian Zhu got married on Jun. 23, 2008", a process of forming the extracted information by using the information extraction method provided in the foregoing embodiments is specifically described as follows.

By defining, as described in the foregoing embodiments, a node format for expressing text information, the to-be-extracted text is parsed to generate a node queue: <begin> <people pos="nr" text="Andy Lau" original="Andy Lau"> <word pos="cc" text="and" original="and"> <people pos="nr" text="Liqian Zhu" original="Liqian Zhu"> <word pos="p" text="on" original="on"> <time pos="time" text="2008-6-23" original="Jun. 23, 2008"> <word pos="vi" text="got married" original="got married"> <end>

Figure 14:
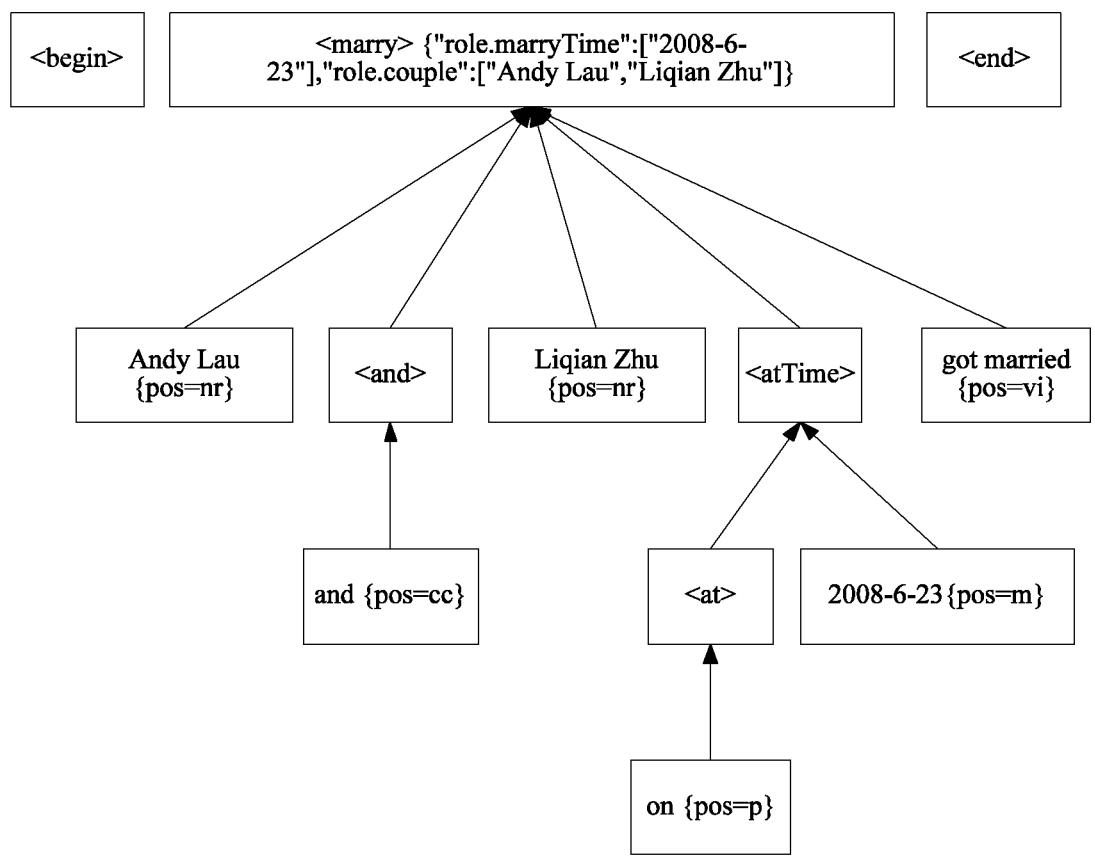
FIG. 14 is a schematic diagram of synthesizing child nodes to generate a parent node based on a node synthesis rule and forming an information tree based on a correspondence between a child node and a parent node according to an information extraction method.

A node synthesis rule defined based on the to-be-extracted text includes:

<marry root collect="role"> := <people role="couple"> <and> <people role="couple"> <atTime orEmpty role="marryTime"> got married
    <and> := and
    <and> := and
    <atTime text="$2"> := <at> <time>
    <at> := at
    <at> := at Referring to FIG. 14, extracted information is formed for the to-be-extracted text. Nodes in the queue are synthesized into a parent node based on a node synthesis rule. A process of forming extracted information based on the parent node may be represented by using a tree structure. Correspondences between two neighboring layers of child nodes and the parent node respectively match corresponding node synthesis rules. A specific matching process is shown in the following table (where in a queue, a node is represented by omitting a text information attribute, and in a stack, a node is represented by omitting a child node).

| step | stack | queue | Hit rule |
|---|---|---|---|
| 0 | [ ] | [ <begin> <people> and <people> on <time> got married <end> ] | |
| 1 | [<begin>] | [ <people> and <people> on <time> got married <end> ] | |
| 2 | [<begin> <people>] | [ and <people> on <time> got married <end> ] | |

| step | stack | queue | Hit rule |
|---|---|---|---|
| 3 | [<begin> <people> and ] | [ <people> on <time> got married <end> ] | |
| 4 | [<begin> <people> <and> ] | [ <people> on <time> got married <end> ] | <and> := and |
| 5 | [<begin> <people> <and> <people> ] | [ on <time> got married <end> ] | |
| 6 | [<begin> <people> <and> <people> on] | [ <time> got married <end> ] | |
| 7 | [<begin> <people> <and> <people> <at> ] | [ <time> got married <end> ] | <at> := at |
| 8 | [<begin> <people> <and> <people> <at> <time> ] | [ got married <end> ] | |
| 9 | [<begin> <people> <and> <people> <atTime text="2008-6-23"> ] | [ got married <end> ] | <atTime text="$2"> :=<at> <time> Message: time→atTime |
| 10 | [<begin> <people> <and> <people> <atTime text="2008-6-23"> got married ] | [ <end> ] | |
| 11 | [<begin> <marray role.couple=[Andy Lau,Liqian Zhu] , role.marryTime=["2008-6-23"]>] | [<end>] | <marry root collect="role"> := .. . Message: Collect:role.couple, role.marrayTime |
| 12 | [<begin> <marray role.couple=[Andy Lau,Liqian Zhu] role.marryTime=["008-6-23"] <end>] | [ ] | | output {role.couple=[Andy Lau,Liqian Zhu],role.marryTime=["2008-6-23"] }

According to the information extraction method provided in the foregoing embodiments, the definition of a node synthesis rule is based on the principle of the text information transmission. There is a clear thread of thoughts for performing information extraction on a node by using the node synthesis rule, and defining a node format and a grammar format of the node synthesis rule is close to a general thinking and understanding mode. Therefore, compiling a custom rule is easier, and understanding is easy. In an information extraction implementation process, extension of node synthesis rules requires only addition of a new rule, without a need to modify a previous rule. Coupling is low between node synthesis rules, and the custom node synthesis rule can be obtained by using the extractor interface, so that extension is easy. The node synthesis rules can reference each other by using a mark, without a need for repeated compilation, a node synthesis rule with a relatively high universality may be extracted into a needed file, management is easy, and repeated use is supported. In the node synthesis rule, text information attached to a node is expressed by using the correspondence between the text information attribute and the text information attribute value, the type of word (or a word type) information may be used, and the custom text information attribute and a node synthesis rule for performing a node operation based on the text information attribute are supported. A recursive definition is supported for a node synthesis rule, and a generalization capability of the information extraction method is enhanced. The information extraction is implemented without a need for training a large quantity of language materials, and costs are relatively low.

Figure 15:
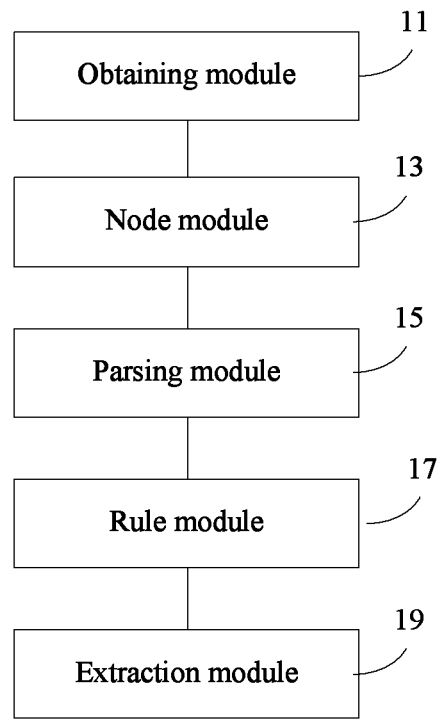
FIG. 15 is a schematic structural diagram of an information extraction system according to some embodiments of the present disclosure.

FIG. 15 is a schematic diagram of an information extraction system according to embodiments of this application. The system may include an obtaining module 11, a node module 13, a parsing module 15, a rule module 17, and an extraction module 19. The obtaining module 11 is configured to obtain a to-be-extracted text. The node module 13 is configured to define a node format of a node that expresses text information. The parsing module 15 is configured to: parse the to-be-extracted text based on the node format to generate a node that expresses text information of the to-be-extracted text, and form a queue by using nodes. The rule module 17 is configured to obtain a node synthesis rule for generating a parent node by using child nodes. The extraction module 19 is configured to: synthesize the nodes in the queue based on the node synthesis rule to generate the parent node, and form extracted information based on the parent node.

Figure 16:
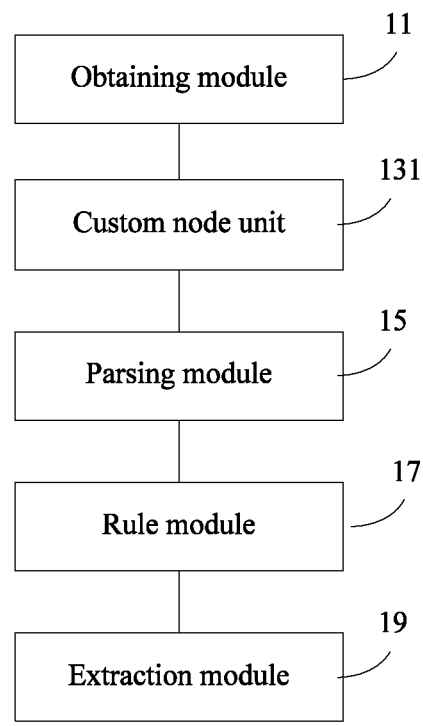
FIG. 16 is a schematic structural diagram of an information extraction system according to some embodiments of the present disclosure.

In some embodiments, FIG. 16 shows an information extraction system according to embodiments. The node module 13 includes a custom node unit 131. The custom node unit 131 is configured to set a custom node. A node format of the custom node is that each custom node is identified by using a first identification symbol. Node content of each custom node includes a node name and text information that is expressed by using a correspondence between a text information attribute and a text information attribute value. The correspondence between the text information attribute and the corresponding text information attribute value is identified by using a second identification symbol. Each text information attribute value is identified by using a third identification symbol.

Figure 17:
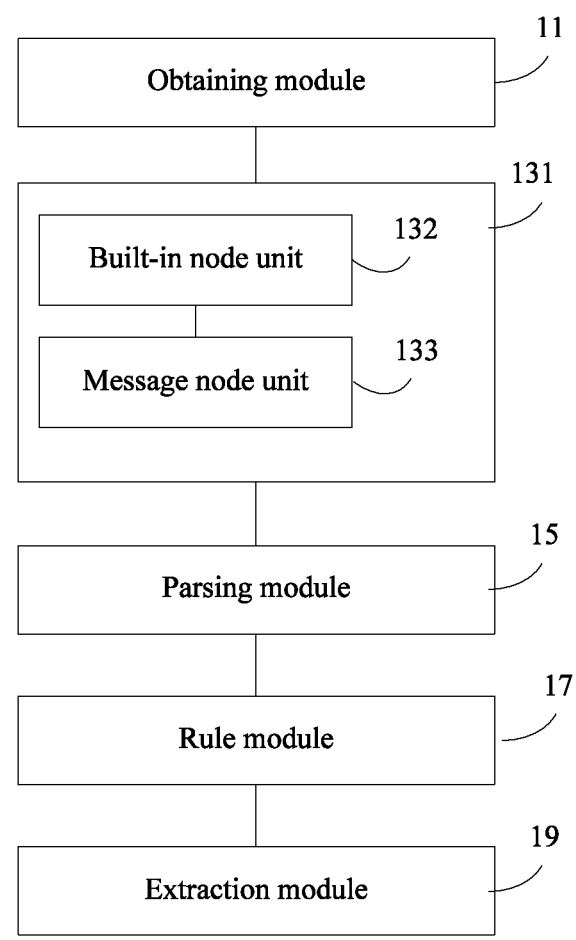
FIG. 17 is a schematic structural diagram of an information extraction system according to some embodiments of the present disclosure.

In some embodiments, FIG. 17 shows an information extraction system according to embodiments. The custom node unit 131 includes a built-in node unit 132 and a message node unit 133. The built-in node unit 132 is configured to set a node of text information related to an expression time, an address, or a person as a built-in node.

The message node unit 133 is configured to set a node related to an expression event type as a message node.

Figure 18:
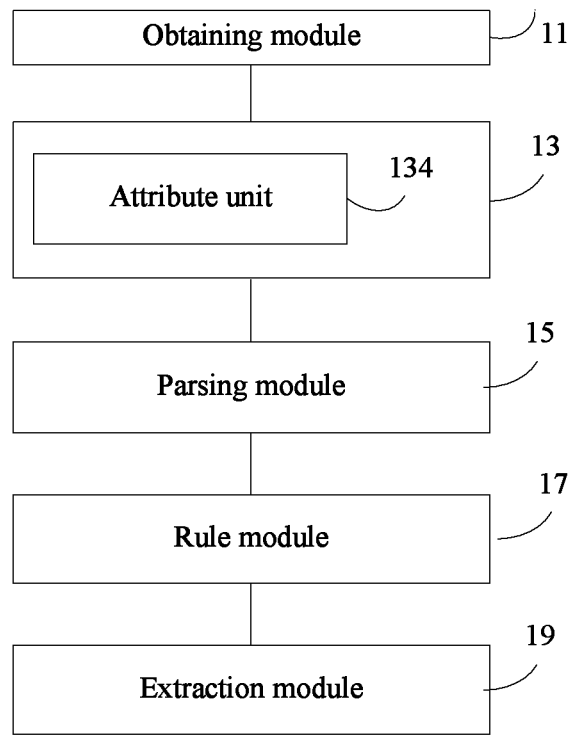
FIG. 18 is a schematic structural diagram of an information extraction system according to some embodiments of the present disclosure.

In some embodiments, FIG. 18 shows an information extraction system according to embodiments. The node module 13 includes an attribute unit 134. The attribute unit 134 is configured to set a type of a text information attribute and a type of a text information attribute value. The text information attribute includes an original character string, a regulated character string, and a type of word (or a word type) mark. A text information attribute value corresponding to the original character string is an original text. A text information attribute value corresponding to the regulated character string is a text converted from the original text in a preset format, and a text information attribute value corresponding to a type of word (or a word type) mark is a preset character used for separately identifying different original text parts of speech.

In some embodiments, the node module 13 includes an attribute unit 134. The attribute unit 134 is configured to set a text information attribute, where the text information attribute includes a nullable attribute.

In some embodiments, the node module 13 includes an attribute unit 134. The attribute unit is configured to set the type of the text information attribute and the type of the text information attribute value, where the text information attribute includes a filtration attribute, and a text information attribute value corresponding to the filtration attribute is a filtration condition.

Figure 19:
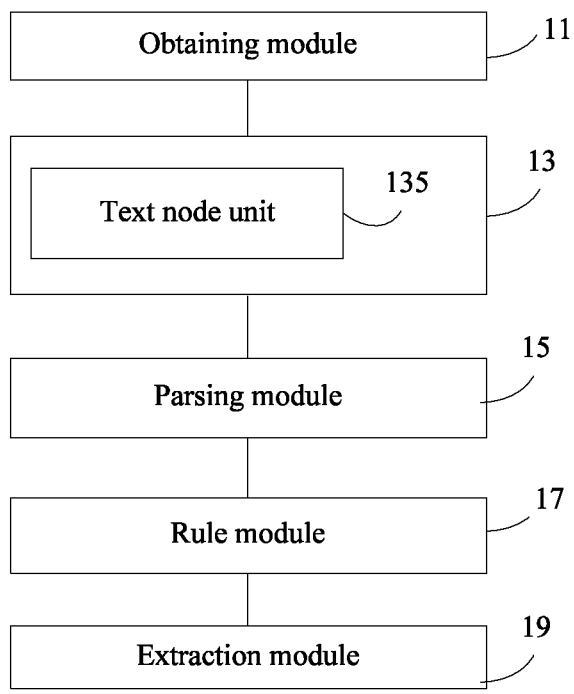
FIG. 19 is a schematic structural diagram of an information extraction system according to some embodiments of the present disclosure.

In some embodiments, FIG. 19 shows an information extraction system according to embodiments. The node module 13 includes a text node unit 135. The text node unit 135 is configured to set a text node, where a node format of the text node is that an original text is directly displayed to express the text information.

Figure 20:
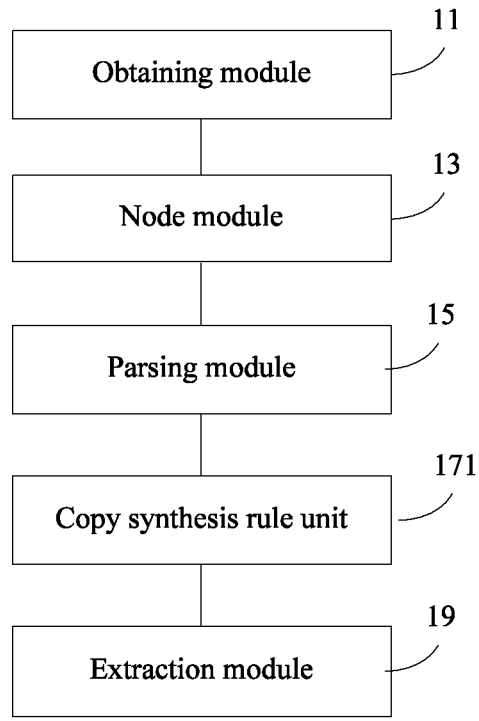
FIG. 20 is a schematic structural diagram of an information extraction system according to some embodiments of the present disclosure.

In some embodiments, FIG. 20 shows an information extraction system according to embodiments. The rule module 17 includes a copy synthesis rule unit 171. A node format of a node includes expressing text information by using a correspondence between a text information attribute and a text information attribute value. The copy synthesis rule unit 171 is configured to obtain a copy synthesis rule for copying a text information attribute value of a specified child node as a text information attribute value of the parent node.

Figure 21:
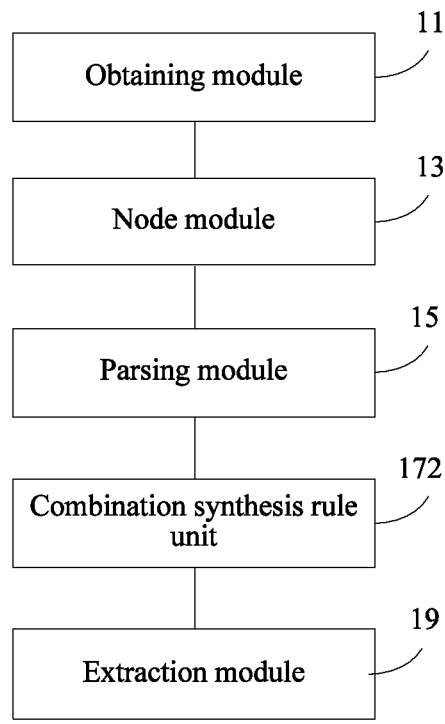
FIG. 21 is a schematic structural diagram of an information extraction system according to some embodiments of the present disclosure.

In some embodiments, FIG. 21 shows an information extraction system according to embodiments. The rule module 17 includes a combination synthesis rule unit 172. A node format of a node includes expressing text information by using a correspondence between a text information attribute and a text information attribute value. The combination synthesis rule unit is configured to obtain a combination synthesis rule for selecting text information attribute values of a plurality of child nodes and combining the text information attribute values to generate a text information attribute value of the parent node.

Figure 22:
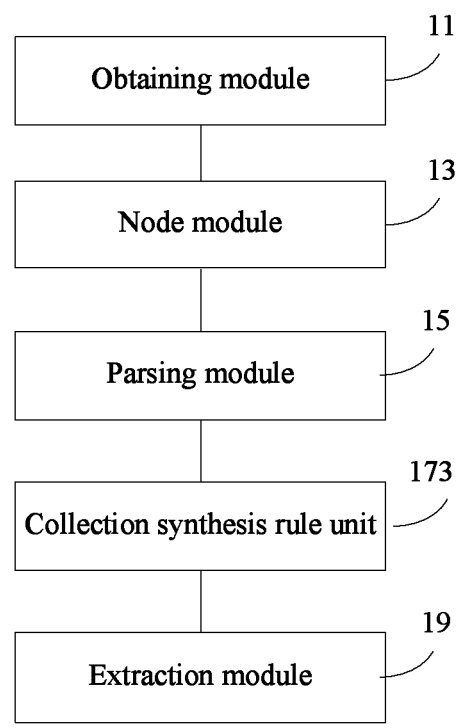
FIG. 22 is a schematic structural diagram of an information extraction system according to some embodiments of the present disclosure.

In some embodiments, FIG. 22 shows an information extraction system according to embodiments. The rule module 17 includes a collection synthesis rule unit 173. A node format of a node includes expressing text information by using a correspondence between a text information attribute and a text information attribute value. The collection synthesis rule unit is configured to obtain a collection synthesis rule for selecting text information attribute values of specified text information attributes of all child nodes to generate a text information attribute value of the parent node.

Figure 23:
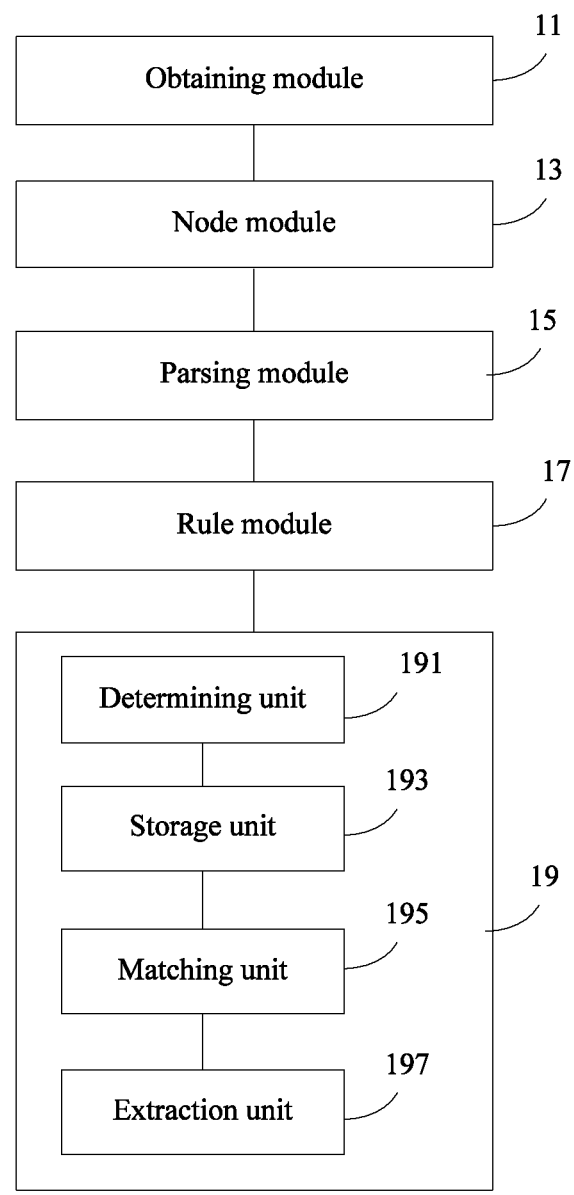
FIG. 23 is a schematic structural diagram of an information extraction system according to embodiments of the present disclosure.

In some embodiments, FIG. 23 shows an information extraction system according to embodiments. The extract module 19 includes a determining unit 191, a storage unit 193, a matching unit 195, and an extraction unit 197. The determining unit 191 is configured to determine whether a queue is null. The storage unit 193 is configured to: when the queue is not null, store a node in the head of the queue into a database to form a to-be-extracted node. The matching unit 195 is configured to: perform matching between the to-be-extracted node in the database and the node synthesis rule, and when the to-be-extracted node matches the node synthesis rule, synthesize to-be-extracted nodes based on the node synthesis rule to generate the parent node, and perform the step of determining whether the queue is null. The extract unit 197 is configured to: when the queue is null, form the extracted information based on the parent node in the database.

A portion in the present disclosure may be realized in the form of a software functional module or sold or used as an independent product, the portion may also be stored in a computer readable storage medium. In the present disclosure, a functional module or a functional portion may refer to one or more computer programs stored in one or more computer readable media. When executed by a processor, the computer programs may implement the corresponding functions of the functional module or functional portion. Further, a functional module or a functional portion may include a hardware component and one or more computer programs stored in one or more computer readable media. When executed by a processor, the hardware component and the computer programs may implement the corresponding functions of the functional module or functional portion.

According to the information extraction system provided in the foregoing embodiments, the definition of a node synthesis rule is based on the principle of the text information transmission. There is a clear thread of thoughts for defining a node synthesis rule, and the defining is easy to understand. In an information extraction implementation process, extension of node synthesis rules requires only addition of a new rule, without a need to modify a previous rule. Coupling is low between node synthesis rules, and the custom node synthesis rule can be obtained by using the extractor interface, so that extension is easy. The node synthesis rules can reference each other by using a mark, without a need for repeated compilation, a node synthesis rule with a relatively high universality may be extracted into a needed file, management is easy, and repeated use is supported. In the node synthesis rule, text information attached to a node is expressed by using the correspondence between the text information attribute and the text information attribute value, the type of word (or a word type) information may be used, and the custom text information attribute and a node synthesis rule that is based on the text information attribute are supported. A recursive definition is supported for a node synthesis rule, and a generalization capability of the information extraction method is enhanced. The information extraction is implemented without a need for training a large quantity of language materials, and costs are relatively low.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a read-only memory (ROM), a random access memory (RAM), or the like.

The foregoing embodiments only provide several implementations, and the descriptions in the embodiments are relatively specific and detailed, but cannot therefore be understood as limitation on the patent scope of the present disclosure. It should be noted that, a person of ordinary skill in the art may make various changes and improvements without departing from the ideas of the present disclosure, which shall fall within the protection scope of the present disclosure.

What is claimed is:

1. An information extraction method, comprising:
retrieving, by a computing device, an unstructured text data from a website;
parsing, by the computing device, the unstructured text data to generate a first node set, wherein the first node set is generated by:
segmenting words in the unstructured text data to obtain a word set of a plurality of words;
extracting a node name and a text information attribute from each word of the word set, wherein the node name represents a content type of the word, and wherein the content type includes a proper noun, and the proper noun includes a person name, a location name, an event name, an address name, a behavior name, a date, or a time; and
forming a node represented by the node name and the text information attribute and including the node in the first node set;
retrieving, by the computing device, a rule database stored as a file on the computing device and identifiable via a storage path, wherein the rule database includes a node synthesis rule that collects a text information attribute value of specified text information attributes of all child nodes for generating text information attribute values of a parent node to complete extraction of text information attached to the child nodes to form the parent node;
generating, by the computing device, a second node set, wherein each node in the second node set describes at least one node in the first node set using the node synthesis rule, wherein, according to the node synthesis rule, the node represented in the first node set by the node name and the text information attribute is transformed into a custom node in the second node set using a first identification symbol, wherein the custom node includes a node name and text information that is expressed to use a correspondence between a text information attribute and a text information attribute value, wherein the correspondence between the text information attribute and the corresponding text information attribute value is identified using a second identification symbol, and different text information included in node content is separated using the second identification symbol, and wherein the custom node is enclosed in angle brackets, and the text information attribute is connected to a text information attribute value with an equal sign; and
generating, by the computing device, structured data based on the second node set.

2. The information extraction method according to claim 1, further comprising:
associating a second text information attribute to the node corresponding to the each word, wherein a second text information attribute value of the second text information attribute represents a type of the word.

3. The information extraction method according to claim 2, further comprising:
combining the first and the second text information attribute values to obtain a combined value; and using the combined value as an attribute value of the custom node.

4. The information extraction method according to claim 1, wherein an arrangement sequence of nodes in the first node set is consistent with an arrangement sequence of the plurality of words in the unstructured text data.

5. The information extraction method according to claim 1, the rule database includes information about a priority of each rule, wherein the method comprises:
performing a rule-search in a descending order of priorities of rules in the rule database.

6. The information extraction method according to claim 1, wherein the node synthesis rule further includes a copy synthesis rule, a combination synthesis rule, or a collection synthesis rule, and wherein:
according to the copy synthesis rule, the custom node is a parent node, and one or more text information attribute values of one or more child nodes are extracted and copied as the text information attribute value of the parent node;
according to the combination synthesis rule, text information attribute values of two or more child nodes are combined as the text information attribute value of the parent node; and
according to the collection synthesis rule, text information attribute values of all nodes are combined as the text information attribute value of the parent node.

7. The information extraction method according to claim 1, wherein the text information attribute is a nullable attribute, indicating the custom node is a nullable node.

8. The information extraction method according to claim 1, wherein the text information attribute is a filtration attribute, indicating the custom node is a filtration node.

9. The information extraction method according to claim 1, wherein parsing the unstructured text data further comprises:
segmenting the unstructured text data into a plurality of subtexts, each of the plurality of subtexts including a clause, a sentence, or a paragraph; and
generating the word set for each of the plurality of subtexts.

10. An information extraction system, comprising at least one processor and a memory, the memory storing a computer readable instruction, and the instruction being capable of enabling the at least one processor to:
retrieve an unstructured text data from a website;
parse the unstructured text data to generate a first node set, wherein the first node set is generated by:
segmenting words in the unstructured text data to obtain a word set of a plurality of words;
extracting a node name and a text information attribute from each word of the word set, wherein the node name represents a content type of the word, and wherein the content type includes a proper noun, and the proper noun includes a person name, a location name, an event name, an address name, a behavior name, a date, or a time; and
forming a node represented by the node name and the text information attribute and including the node in the first node set;
retrieve a rule database stored as a file on a computing device and identifiable via a storage path, wherein the rule database includes a node synthesis rule that collects a text information attribute value of specified text information attributes of all child nodes for generating text information attribute values of a parent node to complete extraction of text information attached to the child nodes to form the parent node;

generating, by the computing device, a second node set, wherein each node in the second node set describes at least one node in the first node set using the node synthesis rule, wherein, according to the node synthesis rule, the node represented in the first node set by the node name and the text information attribute is transformed into a custom node in the second node set using a first identification symbol, wherein the custom node includes a node name and text information that is expressed to use a correspondence between a text information attribute and a text information attribute value, wherein the correspondence between the text information attribute and the corresponding text information attribute value is identified using a second identification symbol, and different text information included in node content is separated using the second identification symbol, and wherein the custom node is enclosed in angle brackets, and the text information attribute is connected to a text information attribute value with an equal sign; and generate structured information based on the second node set.

11. The information extraction system according to claim 10, wherein the instruction is capable of enabling the at least one processor to:

associate a second text information attribute to the node corresponding to the each word, wherein a second text information attribute value of the second text information attribute represents a type of the word.

12. A non-transitory computer readable storage medium, comprising a computer readable instruction, and the instruction being capable of enabling the at least one processor to:

retrieve an unstructured text data from a website;

parse the unstructured text data to generate a first node set, wherein the first node set is generated by:

segmenting words in the unstructured text data to obtain a word set of a plurality of words;

extracting a node name and a text information attribute from each word of the word set, wherein the node name represents a content type of the word, and wherein the content type includes a proper noun, and the proper noun includes a person name, a location name, an event name, an address name, a behavior name, a date, or a time; and forming a node represented by the node name and the text information attribute and including the node in the first node set;

retrieve a preset rule database stored as a file on a computing device and identifiable via a storage path, wherein the rule database includes a node synthesis rule that collects a text information attribute value of specified text information attributes of all child nodes for generating text information attribute values of a parent node to complete extraction of text information attached to the child nodes to form the parent node;

generating, by the computing device, a second node set, wherein each node in the second node set describes at least one node in the first node set using the node synthesis rule, wherein, according to the node synthesis rule, the node represented in the first node set by the node name and the text information attribute is transformed into a custom node in the second node set using a first identification symbol, wherein the custom node includes a node name and text information that is expressed to use a correspondence between a text information attribute and a text information attribute value, wherein the correspondence between the text information attribute and the corresponding text information attribute value is identified using a second identification symbol, and different text information included in node content is separated using the second identification symbol, and wherein the custom node is enclosed in angle brackets, and the text information attribute is connected to a text information attribute value with an equal sign; and generate structured information based on the second node set.

* * * * *